United States Patent
Baird

(10) Patent No.: US 9,737,834 B1
(45) Date of Patent: Aug. 22, 2017

(54) WATER FILTER CARTRIDGE WITH SLANTED NOZZLES

(71) Applicant: Michael T. Baird, Temecula, CA (US)

(72) Inventor: Michael T. Baird, Temecula, CA (US)

(73) Assignee: TST Water, Inc. CA (US)

(*) Notice: Subject to any disclaimer, the term of this patent is extended or adjusted under 35 U.S.C. 154(b) by 0 days.

(21) Appl. No.: 14/719,029

(22) Filed: May 21, 2015

Related U.S. Application Data

(60) Provisional application No. 62/001,472, filed on May 21, 2014.

(51) Int. Cl.
| | |
|---|---|
| *B01D 35/14* | (2006.01) |
| *B01D 35/30* | (2006.01) |
| *B01D 35/147* | (2006.01) |
| *B01D 35/153* | (2006.01) |
| *B01D 29/17* | (2006.01) |
| *C02F 1/00* | (2006.01) |
| *B01D 27/08* | (2006.01) |
| *B01D 29/15* | (2006.01) |

(52) U.S. Cl.
CPC ............ *B01D 35/14* (2013.01); *B01D 27/08* (2013.01); *B01D 29/15* (2013.01); *B01D 35/147* (2013.01); *B01D 35/153* (2013.01); *B01D 35/30* (2013.01); *C02F 1/001* (2013.01); *B01D 2201/29* (2013.01); *B01D 2201/291* (2013.01); *C02F 2201/006* (2013.01); *F25D 2323/121* (2013.01)

(58) Field of Classification Search
CPC ...... B01D 27/08; B01D 35/30; B01D 35/303; B01D 35/147; B01D 35/153; B01D 2201/302; B01D 2201/4023; B01D 24/16; B01D 24/105; B01D 29/15; B01D 2201/29; B01D 2201/291; C02F 1/001; C02F 1/003; C02F 2201/006; F25D 23/126; F25D 2323/121; F25D 2400/06
See application file for complete search history.

(56) References Cited

U.S. PATENT DOCUMENTS

| | | | |
|---|---|---|---|
| 3,228,413 A | * | 1/1966 | Stevens, Jr. .......... B67D 1/0831 137/322 |
| 3,785,164 A | | 1/1974 | Wrenn, Jr. |
| 4,725,354 A | | 2/1988 | Thomsen et al. |
| RE34,031 E | | 8/1992 | Thomsen et al. |
| RE34,050 E | | 9/1992 | Thomsen et al. |
| 5,460,719 A | | 10/1995 | Clack et al. |
| 5,653,871 A | | 8/1997 | Thomsen |
| 6,423,224 B1 | | 7/2002 | Tanner et al. |
| D494,654 S | | 8/2004 | Macaulay et al. |
| 7,000,894 B2 | | 2/2006 | Olsen et al. |

(Continued)

*Primary Examiner* — Katherine Zalasky
*Assistant Examiner* — Benjamin Lebron
(74) *Attorney, Agent, or Firm* — Stetina Brunda Garred & Brucker; Lowell Anderson

(57) ABSTRACT

A water filter cartridge has an end cap with separate inlet and outlet nozzles connected to the end of a cylindrical tube that extends from the end cap. The nozzles are slanted and laterally offset from the cylindrical tube. A cam surface on the outer side of the nozzles actuates valves in a mating manifold. The passage in the nozzles is conical, expanding toward the nozzle end and opening onto a portion of the nozzle side to form a sharper tip. Expanding ice pushes itself out of the conical passage and facilitates ice removal. The narrow end of the conical passage facilitates breakage and removal of ice from the nozzle.

21 Claims, 14 Drawing Sheets

(56) References Cited

U.S. PATENT DOCUMENTS

| | | |
|---|---|---|
| 7,067,054 B2 | 6/2006 | Fritze |
| 7,147,773 B2 | 12/2006 | Mitchell et al. |
| 7,610,932 B2 | 11/2009 | Olson et al. |
| 8,215,492 B2 | 7/2012 | Tanner et al. |
| 8,627,675 B2 | 1/2014 | Kruckenberg et al. |
| 2012/0223002 A1* | 9/2012 | Lin ........................ B01D 35/30 210/232 |

* cited by examiner

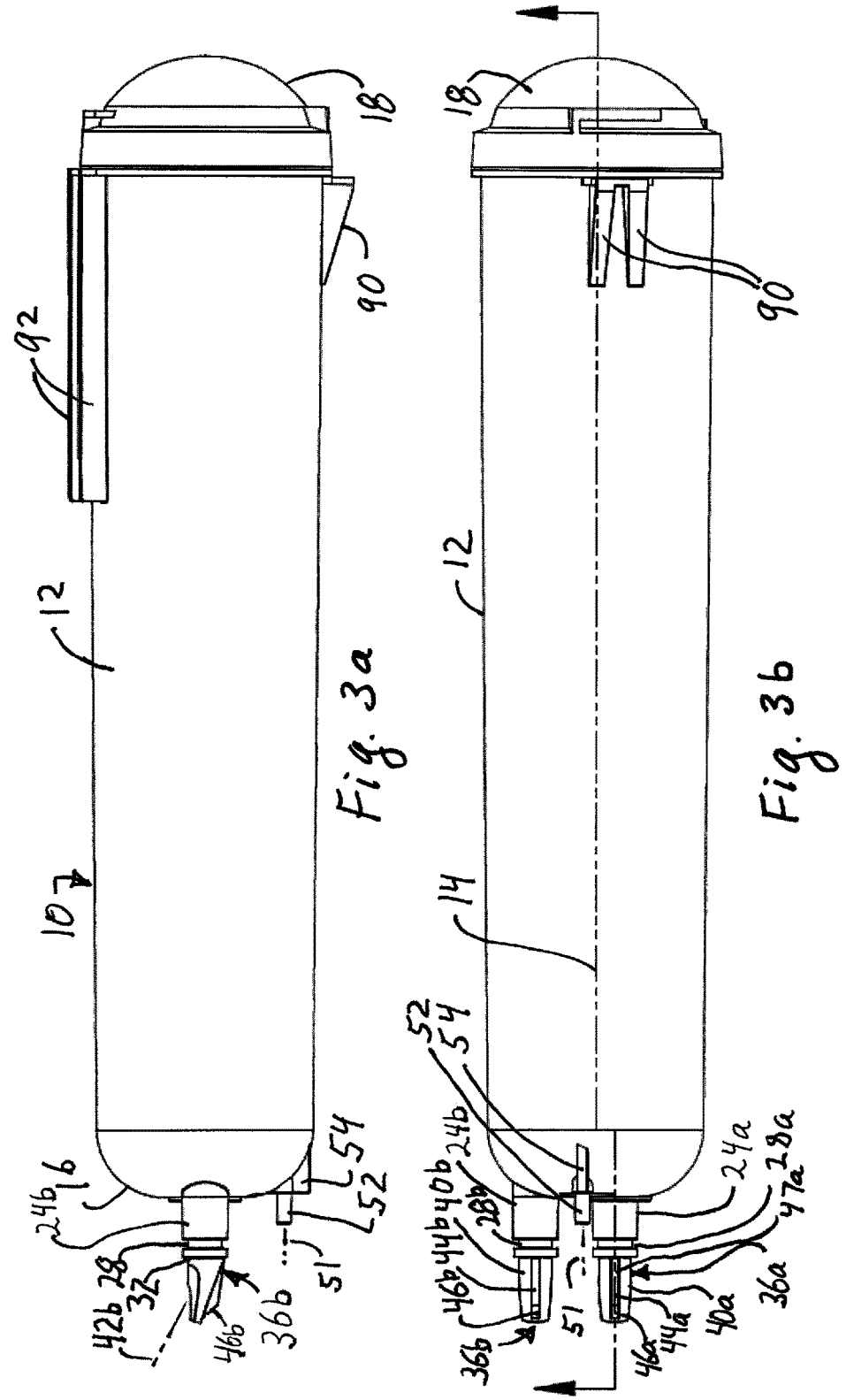

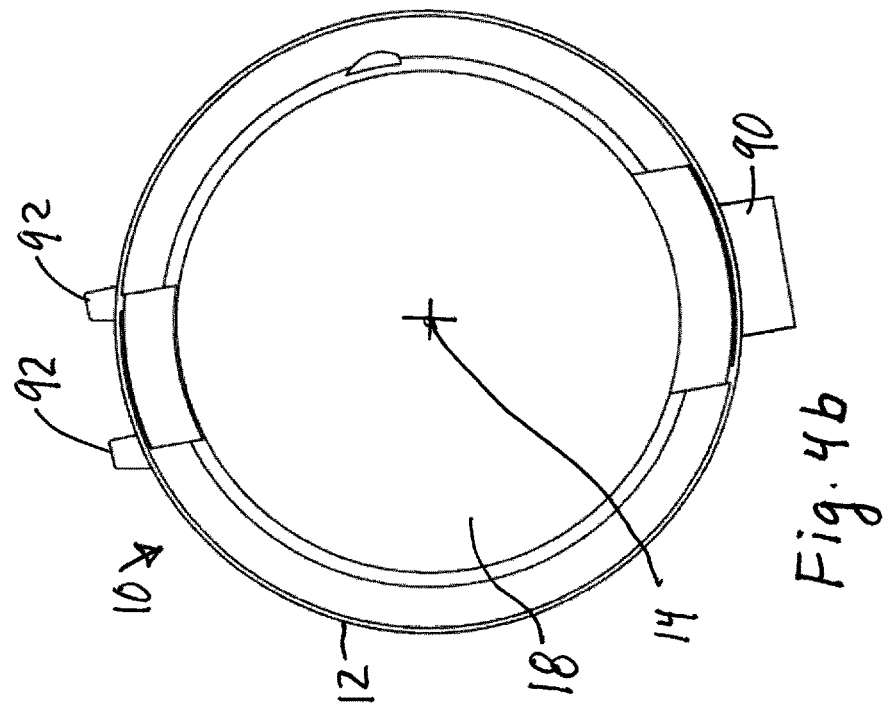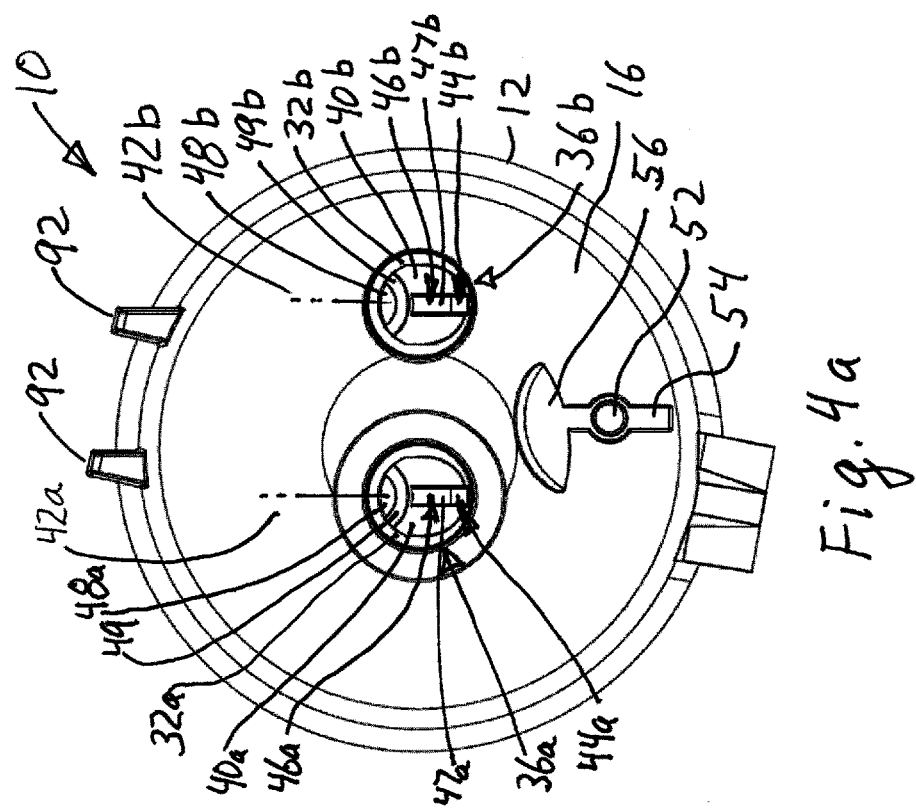

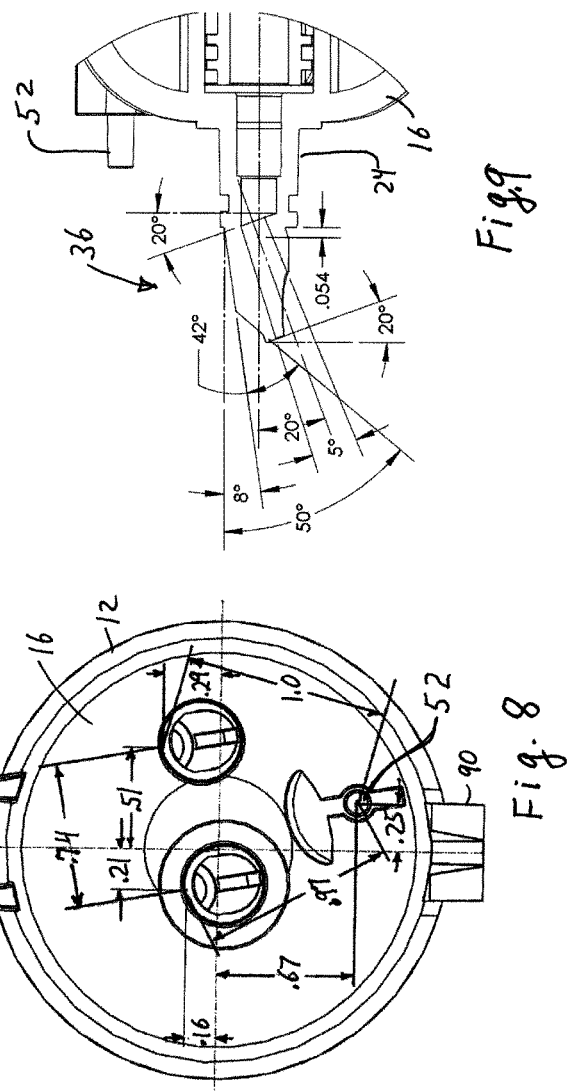

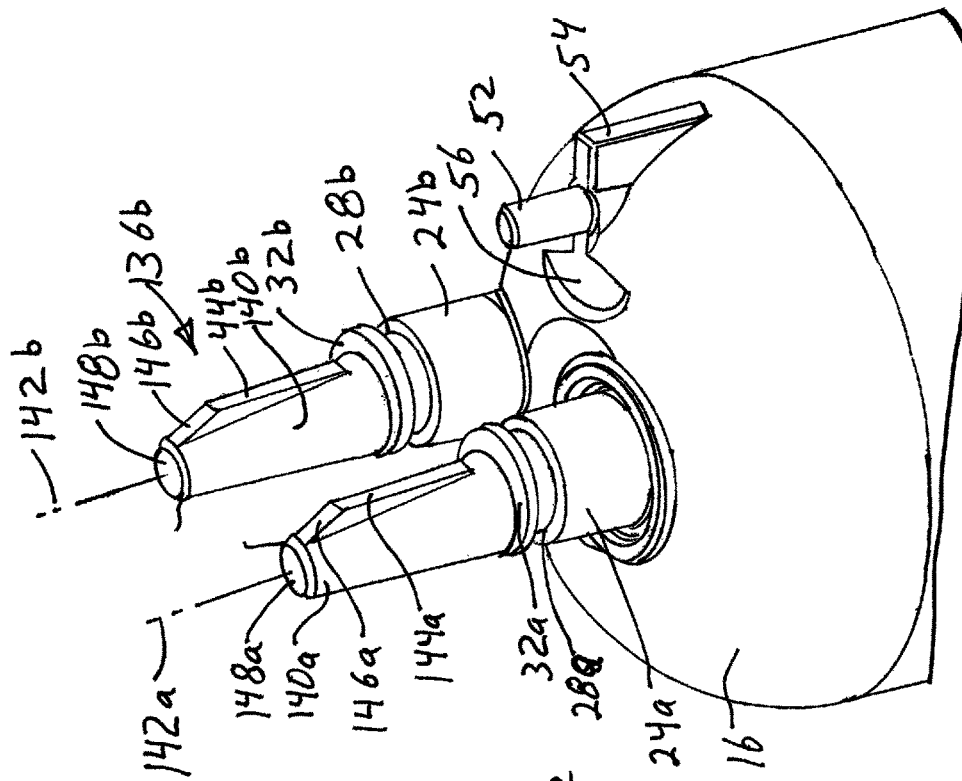
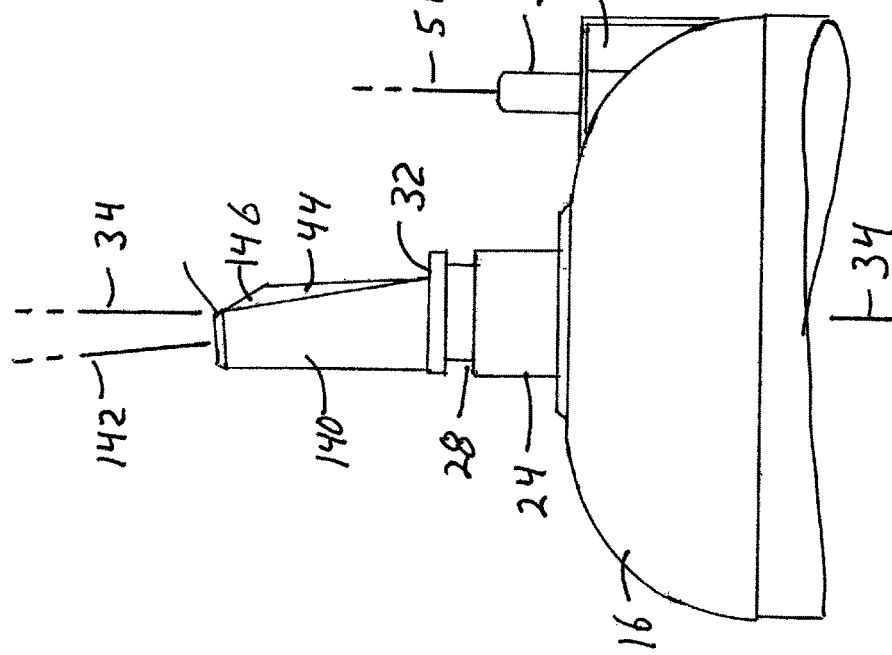

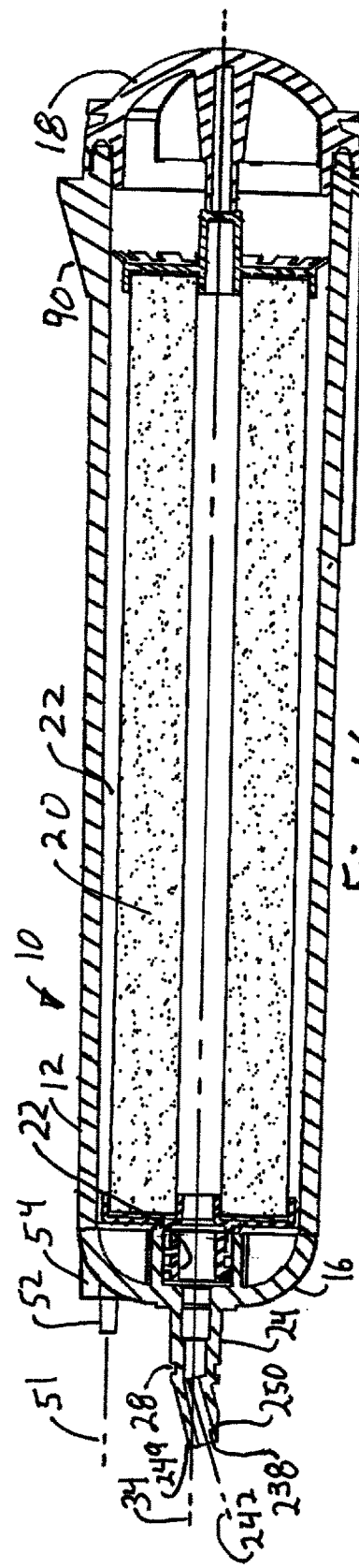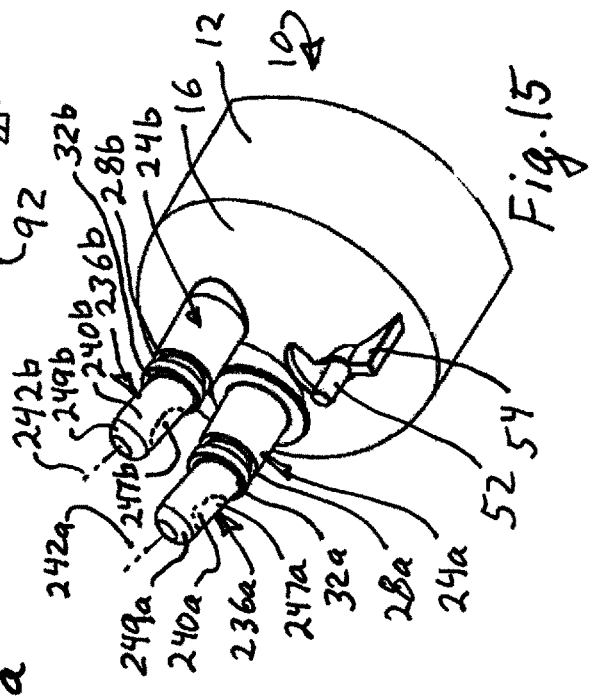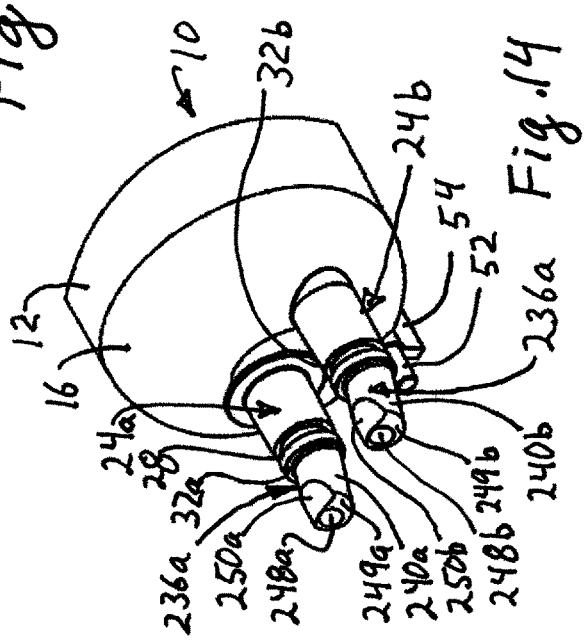

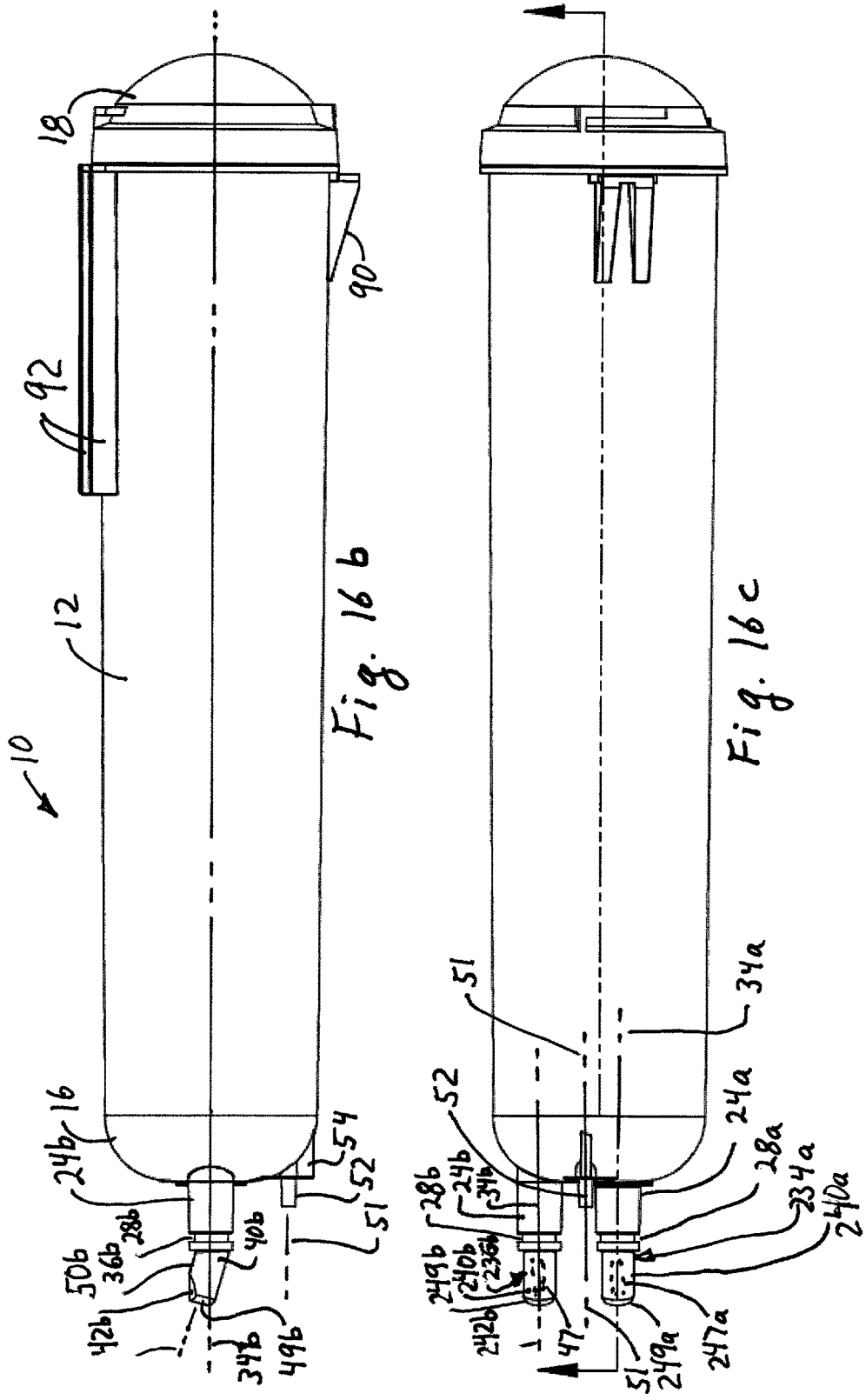

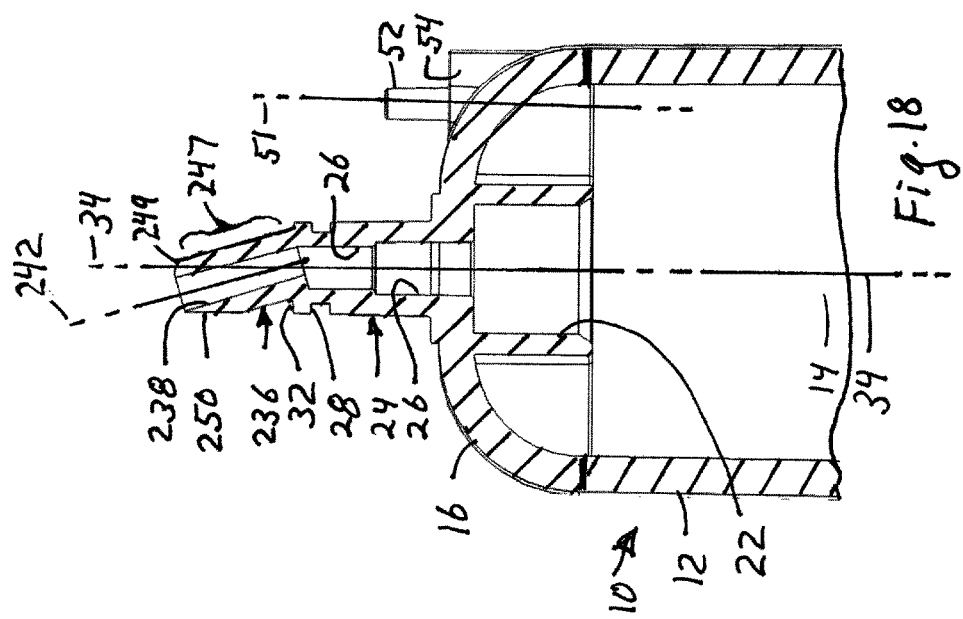
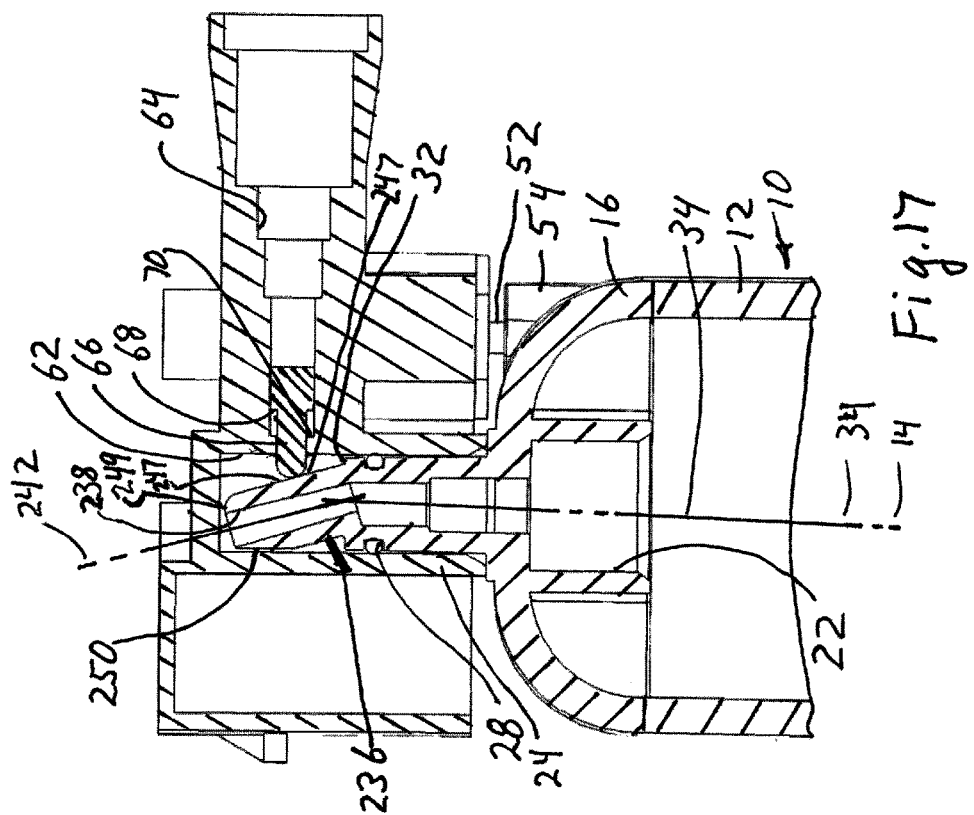

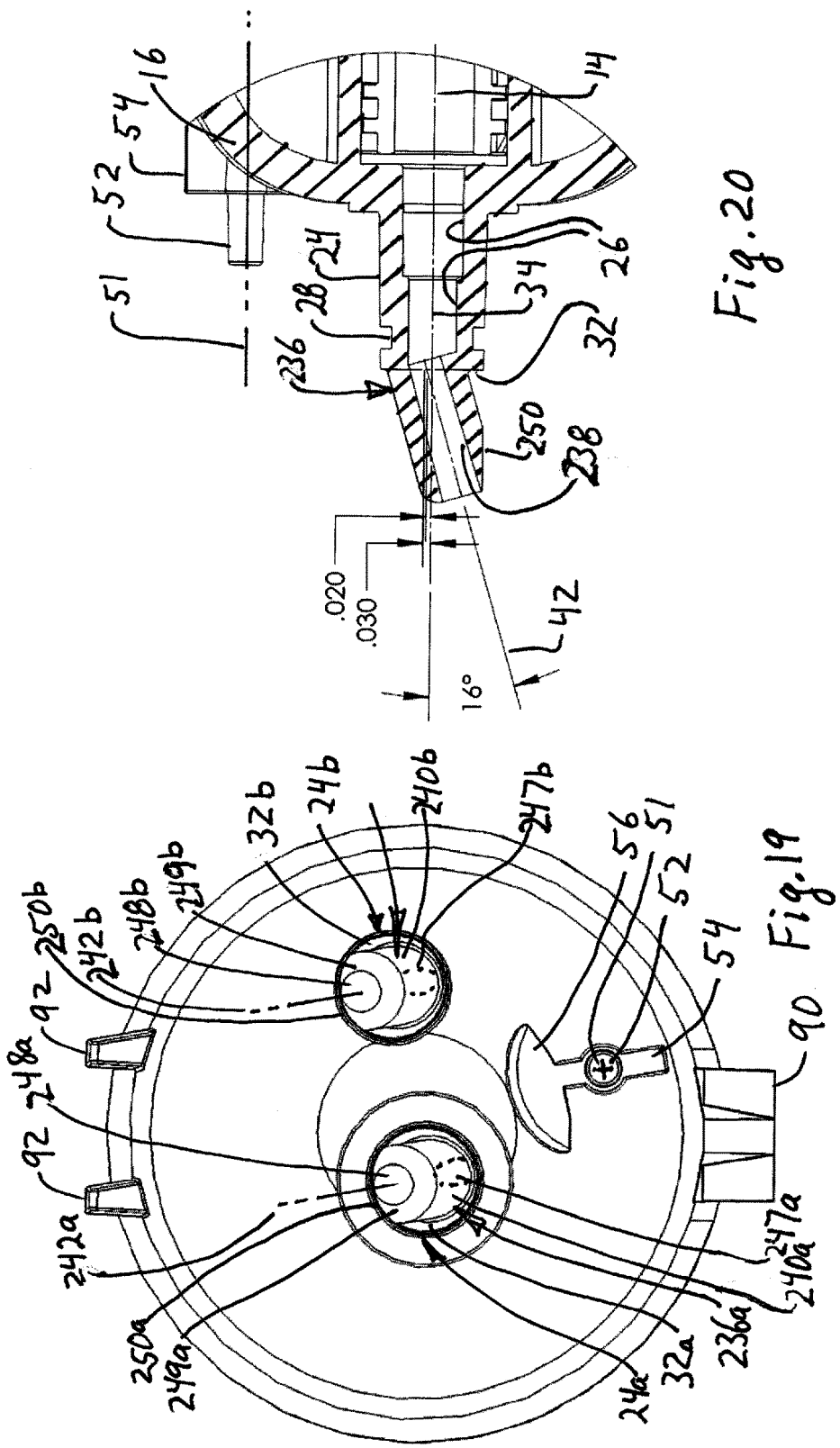

WATER FILTER CARTRIDGE WITH SLANTED NOZZLES

CROSS-REFERENCE TO RELATED APPLICATIONS

The application claims the benefit under 35 U.S.C. §119(e) to Provisional Patent Application No. 62/001,472 filed May 21, 2014 the entire contents of which are incorporated herein by reference.

BACKGROUND

The present invention relates generally to water filter cartridges used in home and business water filter systems, and optionally used in commercial applications. Current filter systems have a manifold with a manifold inlet port connected to a source of water and a manifold outlet port connected to a dispenser for the filtered water, such as a household refrigerator, or an apparatus using filtered water such as a coffee maker. The manifold typically has a cylindrical, cup shaped interior with one or more receptacles for an inlet and outlet nozzle, and occasionally a recess for a bypass valve actuator. If the inlet and outlet nozzles are coaxial then there is usually one receptacle for the inlet and outlet flow of unfiltered and filtered water, respectively. One example of a water filter cartridge and manifold with separate inlet and outlet nozzles and a protrusion for activating a bypass valve is found in U.S. Pat. Nos. 6,610,932 and 7,147,773.

The filters are held in the manifold by bayonet lugs on the cartridge neck, or by cams or mounting assemblies on the elongated body of the filter cartridge. Examples of such mounting assemblies on the filter cartridge are found in U.S. Pat. Nos. 7,147,773 and 8,627,675.

One difficulty with the above filter cartridges is that occasionally the water in the manifold becomes cold enough to freeze and then the filter cartridge is difficult to extract from the manifold and from the retaining mechanism. U.S. Pat. No. 8,627,675 uses a lever insertion and removal mechanism and the mechanical advantage offered by the lever helps remove filter cartridges where the inlet or outlet has frozen. But even with the removal achieved users typically want to quickly clear the ice from the inlet or outlet and immediately reinsert the filter cartridge for use and the current nozzle and manifold designs make that difficult. There is thus a need for an improved filter cartridge that makes it easier to clear ice from frozen inlet or outlet nozzles in the cartridge, and that facilitates clearing ice from the manifold inlet and outlet receptacles.

Additionally, a number of existing manifolds have the inlet, outlet and bypass valve at specific distances and locations relative to each other, such as specified in U.S. Pat. No. 7,610,932. There is a need for a filter cartridge that makes it easier to clear ice from the cartridge inlet and outlet nozzles while tube within those existing manifold designs requiring inlet and outlet nozzles at predetermined locations relative to each other and relative to a protrusion that actuates a bypass valve in the manifold.

BRIEF SUMMARY

A water filter cartridge has an end cap with separate inlet and outlet nozzles connected to the end of a cylindrical tube that extends from the end cap. The nozzles are slanted and offset either laterally from the longitudinal axis of the tube to which they are mounted or offset vertically from the end of the tube to which they are mounted. Illustrated embodiments are disclosed with the nozzles slanted at angles of about 5°, about 20° and about 16°, with lateral offsets of about 0.01 to 0.1 inches and vertical offsets of about 0.02-0.05 inches. The slanted nozzles may have a cylindrical outer surface sized, located and oriented to actuate valves in a mating manifold, or the nozzles may have a longitudinal ridge on the outside of the nozzle forms a cam that actuates valves in a mating manifold. The slanted nozzles may have a conical outer surface located to actuate the valves or they may have a cam extending from the outer surface of the nozzles to actuate the valves. The water passage in the nozzles is conical, expanding toward the nozzle end and opening onto a portion of the nozzle side to form a sharper, distal tip adjacent an end of the cam. Expanding ice pushes itself out of the conical passage and facilitates ice removal. The narrow end of the conical passage facilitates breakage and removal of ice from the nozzle. The slanted orientation of the nozzle tip and when present the ridged cam both provide an irregular surface that facilitates dislodging ice from the manifold port into which the nozzles are inserted during use. The slanted nozzle orientation directs water toward a corner end of the port in the manifold into which the nozzle is inserted during use and the directed flow is believed to help remove ice from the corners.

There is thus advantageously provided a water filer cartridge for operatively engaging a water filter head assembly. The head assembly includes one or more valves for the control of water passing through the head assembly. The head assembly has an inlet cam follower extending into an inlet port to actuate an inlet valve in fluid communication with the inlet port, and has an outlet cam follower extending into an outlet port to actuate an outlet valve in fluid communication with the outlet port. The head assembly may have a bypass valve with a bypass cam follower configured to control water flow to the inlet and outlet ports.

The water filter cartridge includes an end piece having several components. The end piece comprises an end piece wall, an inlet tube, an outlet tube and a protrusion. The inlet tube has a longitudinal axis and extends from the end piece wall. The inlet tube has a distal end spaced apart from the end piece wall. An inlet nozzle is connected to the distal of the inlet tube with the inlet nozzle having a longitudinal axis inclined at an angle to the longitudinal axis of the inlet tube. An inlet flow passage extends along the longitudinal axis of the inlet nozzle and also along the longitudinal axis of the inlet tube. The inlet nozzle has an inlet cam surface extending along a length of the inlet nozzle o the outer surface of that inlet nozzle.

The outlet tube also has a longitudinal axis and it extends from the end piece wall, with outlet tube having a distal end spaced apart from the end piece wall. An outlet nozzle is connected to the distal of the outlet tube. The outlet nozzle has a longitudinal axis inclined at an angle to the longitudinal axis of the outlet tube, with an outlet flow passage extending along the longitudinal axis of the outlet nozzle and along the longitudinal axis of the outlet tube. The outlet nozzle has an outlet cam surface extending along a length of the outlet nozzle on the outer surface of the outlet nozzle. The protrusion extends from the end piece wall and has a longitudinal axis that is positioned between the longitudinal axes of the inlet tube and the outlet tube. The protrusion is located to engage the bypass valve in the head during use.

The water cartridge filter has a cartridge housing with a first end, a closed second end, and a longitudinal axis extending therebetween such that the end piece wall is connected to the first end of the cartridge housing. A portion of the inlet cam surface of the inlet nozzle is inclined relative to the longitudinal axis of the inlet tube to engage the inlet cam follower when the inlet nozzle is inserted into the inlet port of the water filter head assembly during use. A portion of the outlet cam surface of the outlet nozzle is inclined relative to the longitudinal axis of the outlet tube to engage the outlet cam follower when the outlet nozzle is inserted into the outlet port during use.

In further variations, the water filter cartridge advantageously has the longitudinal axis of the inlet nozzle inclined in a direction away from the longitudinal axis of the protrusion such that the shortest distance between the longitudinal axis of the protrusion and the longitudinal axis of the inlet nozzle at a distal end of the inlet nozzle, is greater than the shortest distance between the longitudinal axis of the protrusion and the longitudinal axis of the inlet nozzle adjacent the closest approach with the longitudinal axis of the inlet tube. Likewise, the longitudinal axis of the outlet nozzle is preferably inclined in a direction away from the longitudinal axis of the protrusion such that the shortest distance between the longitudinal axis of the protrusion and the longitudinal axis of the outlet nozzle at a distal end of the outlet nozzle, is greater than the shortest distance between the longitudinal axis of the protrusion and the longitudinal axis of the outlet nozzle adjacent the closest approach with the longitudinal axis of the outlet tube.

In still further variations, the water filter has the inlet flow passage through the inlet nozzle configured in a generally conical shape, with a narrower diameter adjacent the juncture of the inlet nozzle with the inlet tube. Likewise, the outlet flow passage through the outlet nozzle is also generally conical, having a narrower diameter adjacent the juncture of the outlet nozzle with the outlet tube. Further, the inlet flow passage through the inlet nozzle may have an opening at a distal end of the inlet nozzle which has a first portion inclined to the longitudinal axis of the inlet nozzle and a second portion which is orthogonal to the longitudinal axis of the inlet nozzle. The opening at the distal end of the inlet nozzle may have a portion inclined to the longitudinal axis of the inlet nozzle at an angle of up to about 89° with that opening preferably but optionally crossing the longitudinal axis of the inlet nozzle.

Additionally, the flow passage through at least one of the inlet nozzle and outlet nozzle advantageously has an opening at a distal end of the at least one of the inlet nozzle and outlet nozzle which opening lies generally in a plane. That opening preferably lies in a plane and forms a generally elliptical shape when viewed along an axis parallel to the longitudinal axis of the inlet or outlet tube. In still further variations the water filter cartridge the flow passage through at least one of the inlet and outlet nozzles has an opening at a distal end of the at least one inlet or outlet nozzle which has a first portion inclined to the longitudinal axis of the at least one inlet or outlet nozzle and has a second portion orthogonal to the longitudinal axis of the at least one inlet or outlet nozzle. The portion orthogonal to the longitudinal axis of the at least one inlet or outlet nozzle advantageously subtends an arc of about 90 degrees.

In still further variations, at least one of the inlet and outlet nozzles are inclined at an angle of about 2-26° relative to an axis parallel to the longitudinal axis of the inlet or outlet tube to which the slanted nozzle is connected. More preferably at least one of the inlet and outlet nozzles are inclined at an larger angle of about 18-26° relative to an axis parallel to the longitudinal axis of the inlet or outlet tube to which the slanted nozzle is connected with the slanted nozzle preferably offset laterally about 0.05 to about 0.15 inches from the axis of the respective inlet or outlet tube in a plane orthogonal to the inlet or outlet axis. Still more preferably at least one of the inlet and outlet nozzles are inclined at an larger angle of about 15-17° and ideally about 16° relative to an axis parallel to the longitudinal axis of the inlet or outlet tube to which the slanted nozzle is connected, with the axis vertically offset about 0.01-0.05 inches from the plane of the end of the tube. Less preferably the longitudinal axes of the slanted nozzles are inclined at a shallow angle of a few degrees, with that nozzle axis preferably offset laterally about 0.05 to about 0.15 inches from the axis of the respective inlet or outlet tube in a plane orthogonal to the inlet or outlet axis.

As the angle of inclination of the axis of the slated nozzles increases the opening of the flow passage at the distal end of the slanted nozzle changes from an opening in one plane to an opening in two generally inclined planes, and changes from a generally circular shape at small angles of inclination to a generally elliptical shape at larger angles of inclination of the nozzle axis. The shape of the flow passage opening changes in part because the opening is preferably but approximately defined by the intersection of a first imaginary cylinder about the diameter of the tube to which the nozzle is mounted and extending along the longitudinal axis of that tube, and the intersection of a second imaginary curved surface extending along the outer surface of the slanted nozzle and along the longitudinal axis of that slanted nozzle.

In still further variations, there is an outlet seal encircling the outlet tube adjacent the distal end of the inlet tube and an inlet seal encircling the outlet tube adjacent the distal end of the inlet tube. Also, the inlet cam surface preferably has a first cam portion extending along a length of an outer surface of the inlet nozzle at a first angle relative to an axis parallel to the longitudinal axis of the inlet tube, and has a second cam end portion adjacent a distal end of the inlet nozzle which second cam end portion is inclined at a second angle relative to the axis parallel to the longitudinal axis of the inlet tube, with the second angle being greater than the first angle. The outlet cam surface may be similarly shaped. The above variations may be used singly, or used together in any combination.

BRIEF DESCRIPTION OF THE DRAWINGS

These and other features and advantages of the invention will become more apparent in light of the following discussion and drawings, in which like numbers refer to like parts throughout, and in which:

FIG. 3a is a side plan view of a complete filter cartridge containing the end of FIG. 1 oriented so that the longitudinal axes of the outlet tubes to which the nozzles are mounted are in the same plane;

FIG. 3b is a top view of the filter cartridge of FIG. 3a;

FIG. 4a is a left end view of the filter of FIG. 3a;

FIG. 4B is a right end view of the filter of FIG. 3a

FIG. 6b is a top perspective view of the filter cartridge of FIG. 6a;

FIG. 8 is a left end perspective view of the filter cartridge of FIGS. 1 and 4a, showing dimensional relationships;

FIG. 9 is a sectional view as in FIG. 5 showing angles for the embodiment of FIGS. 1-9;

FIG. 10 is a side view of a second embodiment with a slanted nozzle inclined slightly at an angle of about 5°, oriented so the longitudinal axes of the tubes to which the nozzles are mounted are in the same plane, and showing slightly conical nozzles tapering toward the distal end of each nozzle;

FIG. 11 is a perspective view of the embodiment of FIG. 10;

FIG. 14 is a perspective view of a third embodiment with the nozzles inclined at an angle of about 16° with generally cylindrical nozzles;

FIG. 15 is a perspective view of the embodiment of FIG. 14 from the opposing direction;

FIG. 16a is a sectional view of a filter taken through one of the nozzles with the longitudinal axes of the tubes to which the nozzles are connected in the same plane;

FIG. 16b is a side view of the filter of FIG. 16a;

FIG. 16c is a top view of the filter of FIG. 16a;

FIG. 17 is a cross-sectional view of the nozzle as in FIG. 16a in a manifold;

FIG. 18 is a cross-sectional view of the nozzle as in FIG. 16a;

FIG. 19 is an end view of the embodiment of FIGS. 14-15; and

FIG. 20 is a cross-sectional view of the nozzle as in FIG. 16a showing the nozzle offset from the tube to which it is connected.

DETAILED DESCRIPTION

Figure 1:
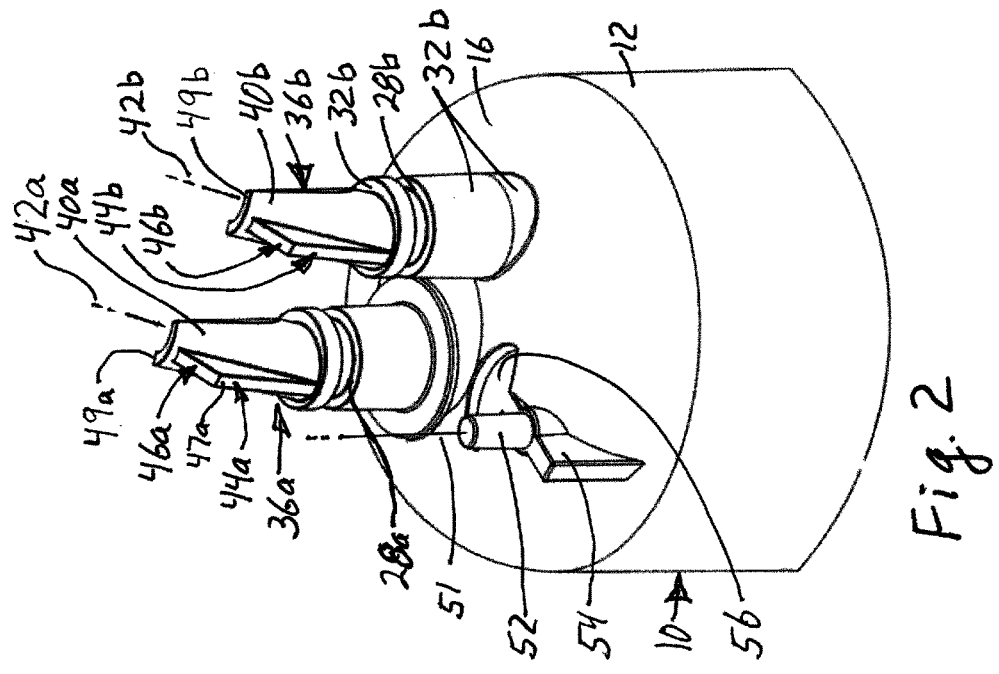
FIG. 1 is a top perspective view of an end of a filter cartridge of this invention with the nozzles slanted at a large angle of about 20 degrees.
Figure 2:
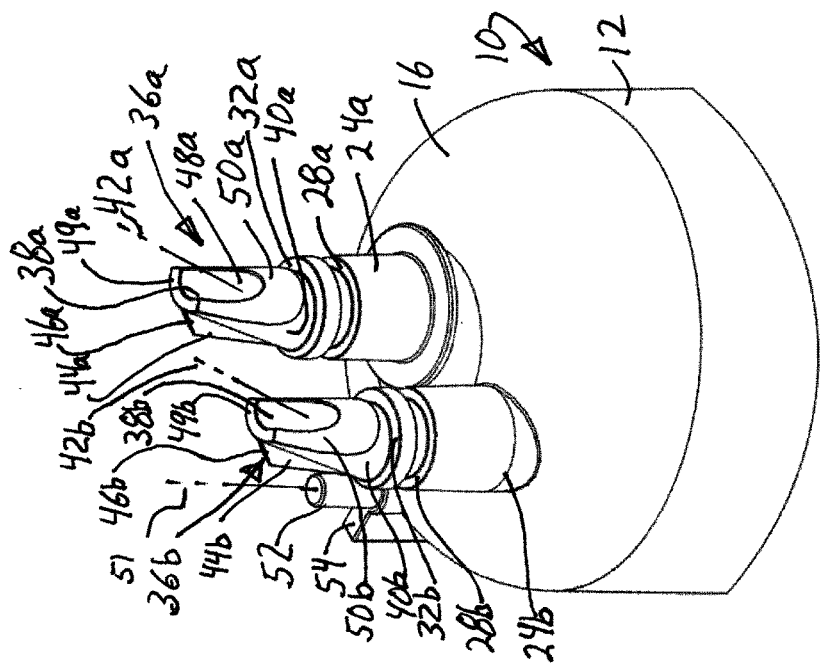
FIG. 2 is a bottom perspective view of the end of the filter cartridge shown in FIG. 1.
Figure 3C:
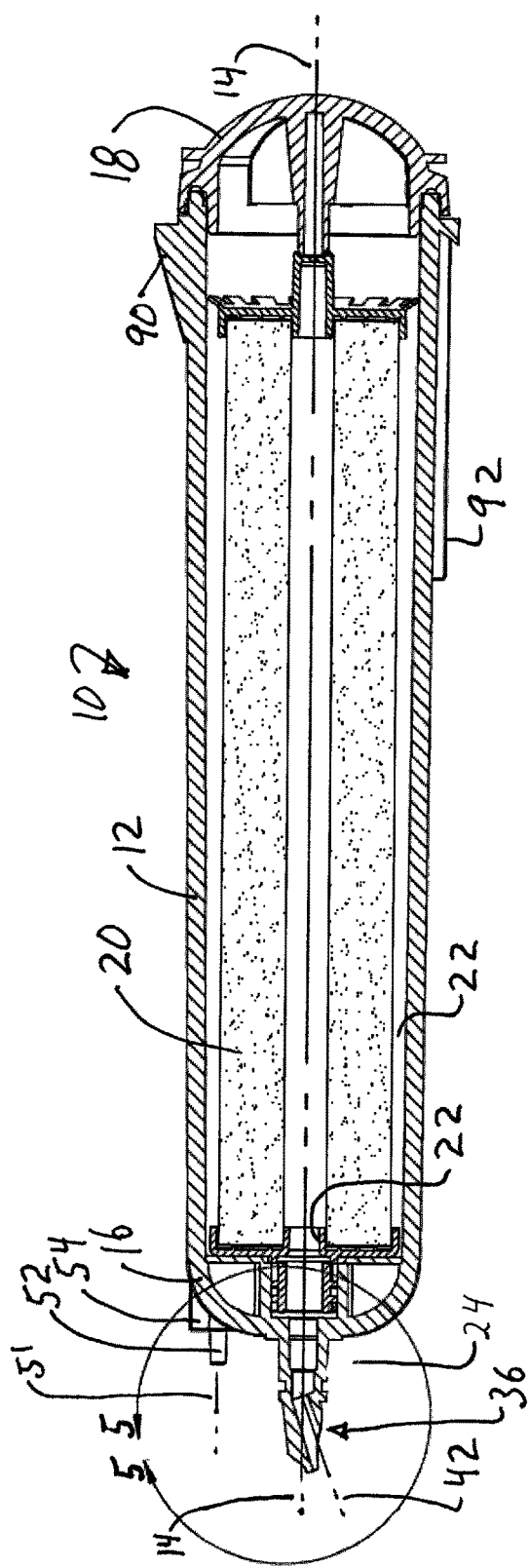
FIG. 3c is a sectional view taken along section 3c-3c of FIG. 3b.

Referring to FIGS. 1-9, a water filter cartridge 10 has a cartridge sidewall 12 that is typically cylindrical and extends along a longitudinal 14 passing through the centerline of the cylinder. The sidewall is closed by first and second ends 16, 18 so the sidewall and ends enclose a filter element 20. Internal passages 22 within the filter cartridge 10 direct unfiltered water through the filter element 20 and filtered water out of the filter element 20 through inlet and outlet nozzles that may take various shapes. In the depicted embodiment the inlet and outlet are separated rather than being coaxial.

First and second tubes 24 extend from the first end 16 of cartridge 10. Thus, first tube 24a and second tube 24b respectively extend from the first end 16 of the cartridge 10. The tubes 24 each have an inner passage 26, so first tube 24 has inner passages 26a and second tube 24b has second inner passage 26b, each passage extending along a length of the respective tube 24a, 24b. As the tubes 24a, 24b extend from the end wall of the first end 16 and have a distal, they have a second end 32a, 32b spaced a distance (preferably short) apart from the first end wall 16. The tubes 24a, 24b each have a longitudinal axis 34a, 34b, respectively, extending through the center of each tube 32a, and 32b. When viewed from the side the longitudinal axes of tubes 32a, 32b may coincide with the longitudinal axis 14 in the preferred embodiment (FIGS. 3a & 5) and when viewed from the front or back (FIG. 3c) the axes 32a, 32b are on opposing sides of the cartridge's axis 14. The tubes 24 and inner passages 26 are preferably cylindrical.

First and second nozzles 36a, 36b, respectively are connected to the corresponding distal or second ends 32a, 32b of the first and second tubes 24a, and 24b, respectively. The nozzles 36 have an inner flow passage 38, so first nozzle 36a has first inner flow passage 38a and second nozzle 36b has second inner passage 38b. Each nozzle 36 has an outer surface 40 so first and second nozzles 36a, 36b have outer surfaces 40a, 40b, respectively. In the illustrated embodiment the outer surface 40 is generally cylindrical but extends along axis 42 of the nozzle 36 with the axis 42 and nozzle outer surface 40 both being slanted or inclined at an angle to the longitudinal axis 34 of the tube 32 to which the nozzle 36 is connected. Because the axis 34 may be offset laterally from the axis 42 the reference to axis 42 being inclined relative to axis 34 is to be understood as meaning inclined to an intersecting axis 34 or inclined to an axis parallel to axis 34 but intersecting the axis 42. Thus, each inner nozzle passage 38 has a longitudinal axis 42 through the center of the passage 38, so first and second nozzles 36a, 36b have longitudinal axes 42a, 42b, respectively. The nozzle longitudinal axes 42 are slanted relative to the longitudinal axis 34 of the tubes 24 and relative to the longitudinal axis 14 of the filter cartridge 14. An angle of inclination of about 2-30 degrees relative to axis 14 is believed suitable, with an inclination of about 18-26 degrees believed more preferable and an angle of about 20 degrees being preferred. The construction of the nozzle 36 alters with the angle of inclination of axis 42 as described below.

The nozzle axis 42a and tube axis 34a may be placed in the same first plane, with nozzle axis 42b and tube axis 34b being placed in a second plane such that the axes 42, 34 intersect in those planes. As seen in FIG. 9, that intersection occurs along a length of the nozzle axis 42 that is spaced apart from the end of the nozzle 36 and spaced a distance above the end 32 of the tubes 24. In the plane of the end 32 of the tubes 24, which plane is orthogonal to tube axis 34 the nozzle axis 42 is offset laterally from the axis of inlet/outlet tube 24, as well as being inclined to that axis. In the preferred embodiment where the internal passage 38 has a longitudinal axis that is inclined at an angle of about 20° to the tube axis 34 (and to the vertical as shown in FIG. 9), the lateral offset is about 0.05-0.15 inches. The amount of offset will vary with the angle of inclination of nozzle axis 42 relative to the tube axis 34.

Still referring to FIGS. 1-9, in the depicted, preferred embodiment the internal passage 26 of the tube 24 has a distal end that is inclined at an angle of about 20° to the longitudinal axis 34 of the tube 24 and the offset distance of axes 34, 42 along that inclined. In the preferred embodiment the interior passage 26 of the tube 24 is a larger diameter than the adjoining diameter of nozzle passage 36, with the diameter of the nozzle passage 36 being almost half the diameter of the tube passage 26 when measured along the inclined, intersecting plane in which the tube's passage 26 ends.

Each nozzle 36 has a cam surface 44 extending therefrom located to actuate a valve in the manifold with which the filter cartridge mates during use. The cam surface 44 preferably comprises a ridge extending in a radial direction relative to nozzle axis 42, so first nozzle 36a has cam surface 44a and second nozzle 36b has second cam surface 44b. Each cam surface 44 preferably has a distal end 46 adjacent a distal end of the nozzle 36 that is further curved or inclined to facilitate engagement of the cams 44, 46 with a valve in the manifold as described later. The first nozzle 36a thus has first cam 44a and distal cam end 46a, while second nozzle 36b has second cam 44b and distal cam end 46b. The cams 44, 46 have a surface 47 facing outward from the longitudinal axis 14 of the nozzle 36 which surface 47 abuts a cam follower during use in order to actuate a valve. Depending on the particular cam follower and the position of the nozzle 36 within the manifold the cam surface may be on end 46 or ridge 44 or both.

Figure 5:
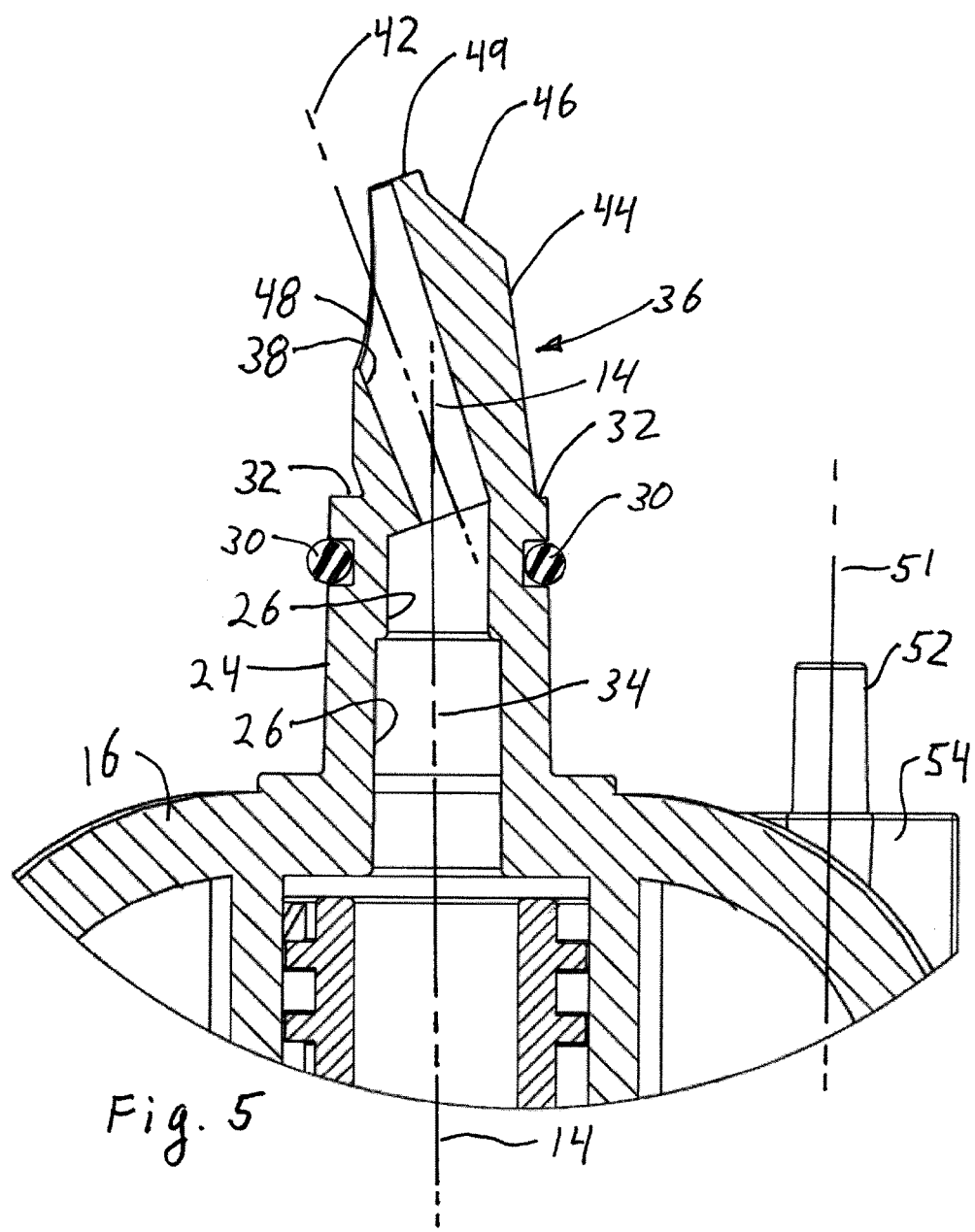
FIG. 5 is a sectional view taken along section 5-5 of FIG. 3c
Figure 6B:
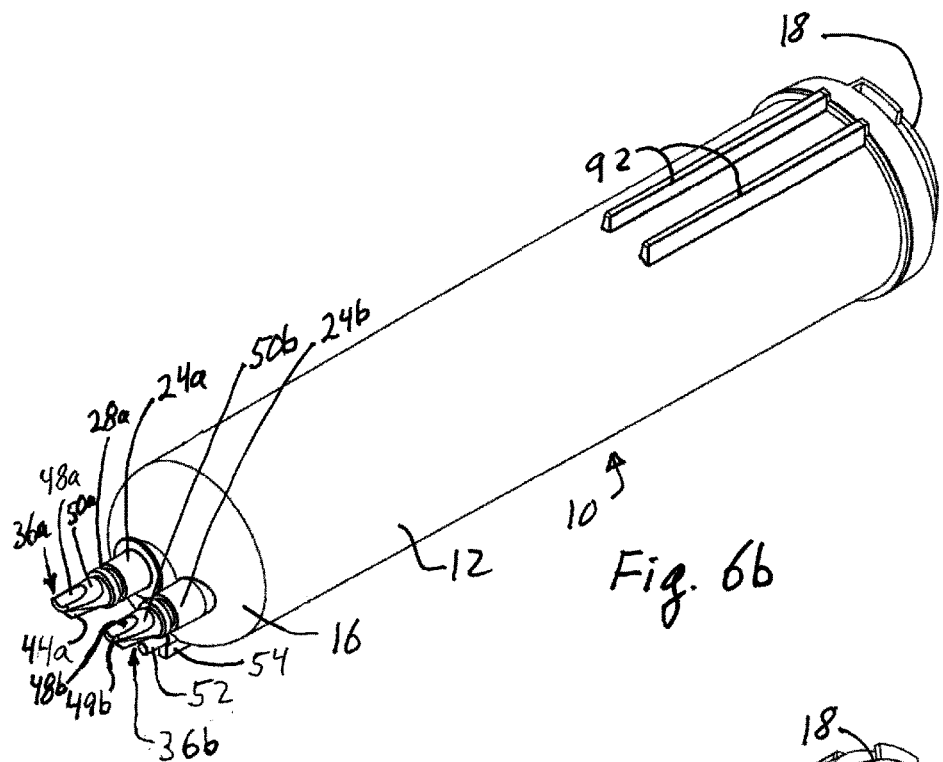
Figure 6A:
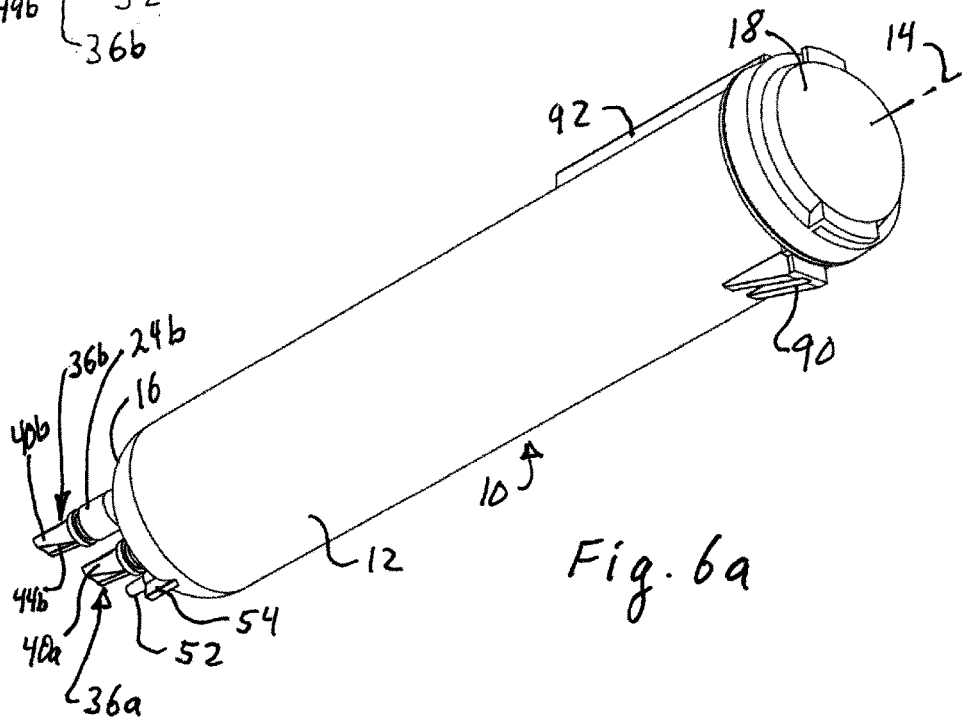
FIG. 6a is a lower perspective view of the filter cartridge of FIGS. 3a-3b.

The distal end of each nozzle 36 has an opening 48 formed by the intersection of the inner passage 38 of the nozzle with the wall forming the nozzle. While each nozzle 36 could have a distal end completely orthogonal to the nozzle axis 42, the preferred nozzle has an end with a first portion 49 orthogonal to the nozzle axis 42 and a second portion formed 50 by the intersection of an inclined and curved surface with the nozzle axis 42. There is thus first nozzle 36a with first end portion 49a and second end portion 50a, and a second nozzle 36b with first end portion 49b and second end portion 50b. The second end portion 50 is preferably a curved surface formed by the intersection of a first cylindrical tube extending along the axis 34 and having a diameter slightly less than the outer diameter of tubes 24, and the intersection of a second cylindrical tube having an outer diameter of nozzle 36 immediately adjacent the end 32 of tube 24 and having an inner diameter of conical passage 38, when the second cylindrical tube is inclined at an angle of the axis 42, which in the illustrated embodiment is about 20°. The first end portion 49 is in a plane orthogonal to the nozzle axis 42. The nozzle end portions 49, 50 arise because the nozzles 36 fit into cylindrical ports in the manifold during use and the inclined nozzles are shaped to fit within these cylindrical boundaries and allow water to flow into and out of the openings 48 of the nozzle 36. The opening 48 is generally in the same plane as seen in FIGS. 1, 5 and 9 (not numbered in FIG. 9) and as used herein the generally in the same plane has the edges deviating by less than about 3 mm from the plane of the surface 50 defining its portion of the opening 48.

As noted above, the construction of the nozzle 36 alters with the angle of inclination of axis 42. The nozzle 36 and cams 44, 46 fit within mating surfaces of a manifold described below, and the mating surfaces are a cylinder that encircles the tubes 24 so that seals 30 provide a water tight seal. Thus, the nozzle 36 and cams 44, 46 fit within a cylinder extending along outer cylindrical walls of tube 24 and end 32 and centered on tube axis 34. As the slant angle of the nozzle axis 42 increases the opening 48 extends closer to the cylindrical tube encircling tube 24, the outer surface 40 of the nozzle must be cut away to fit within that tube. Thus, at a nozzle axis inclination angle of about 20° as shown in FIGS. 1, 5 and 9, the nozzle sidewall with outer surface 40 would extend beyond the cylindrical tube encircling tube 24 and its axis 34, with the result that the outer surface is cut at an inclined angle to nozzle axis 42 so the sidewall surface 40 does not pass that cylindrical boundary and having opposing sides of the opening 48 defined by edge 50 spaced from the cylindrical boundary to allow water to flow past edge 50 into or out of the portion of opening defined by edge 50. A nozzle with a smaller inclination is described below.

Referring to FIGS. 1-9, the first end wall 16 of the filter cartridge also has protrusion 52 extending parallel to axis 14 and located to actuate a bypass valve in the manifold as described later. The projection 52 may extend from a boss 54, depicted as the corner of a rectangular body in a radial plane relative to the filter cartridge axis 14, with an outer edge at or about the periphery of the filter body 12. To allow the projection 52 to fully mate with the manifold during use, the end wall 16 may have a shaped recess 56 to accommodate a portion of the manifold as described later. The depicted recess is semi-circular in shape and in the same plane as a top or distal end of the boss 54 (FIG. 1).

Advantageously the cam surfaces 44 comprises a ridge having a rectangular cross-sectional shape having parallel sides extending radially outward relative to nozzle axis 42 with cams 44a, 44b being parallel to each other and in two parallel planes on opposing sides of the longitudinal axis 14, each of which planes contain one of the longitudinal axis 42. The cams 44, 46 advantageously have the narrow edge of the rectangular shape extend extending along the length of the respective cams so the cams resemble the corner of a plate having an included angle of about 160° with various details shown in FIG. 9 for the illustrated embodiment with a nozzle inclined at about 20°. In the depicted embodiment the actuating surface of cam 44 is a straight surface inclined at an angle of about 8° from an axis parallel to the longitudinal axis of the cartridge or from the tube 24. intersection of the nozzle axis and the actuating surface of cam 44 so the actuating surface is further from the nozzle axis adjacent the opening 48 when the axis 42 and actuating surface of cam 44 are in the same plane. The actuating surface of end cam 46 is inclined toward the nozzle axis 42 at an angle of about 50° relative to an axis through or parallel to the longitudinal axis of the filter cartridge, and angled at about 8° from the straight edge of the cam portion 46. While the actuating surfaces are shown as straight, they could be curved. In use, the distal end cam 46 helps facilitate movement of a valve onto the cam 44 which actuates the valve. Since the first and second nozzles 40a, 40b may be either an inlet or outlet, depending on the specific arrangement of internal filter passages the cams 44 may actuate either an inlet valve or an outlet valve.

The end cam 46 preferably connects to the nozzle 40 at or very close to the first distal end portion 49 and connects at an inclined angle to the plane of the first end portion 49 which is orthogonal to nozzle axis 42. The second portion of the nozzle opening 50 abuts the first nozzle end portion 49 at an angle of about 42° from an axis parallel to the longitudinal axis of the filter cartridge as seen in FIG. 9, and advantageously leaves the first end portion 49 subtending an arc of about 90° or about 25% of a circle as seen in FIGS. 4a and 8. In short, about 25% of one edge of a cylindrical tube is inclined to abut a frozen surface during use. The result is relatively small, first nozzle end portion 49 with sides 40, 46, 50 converging at different angles to form a blunt point on the end of the nozzle 48. That blunt point makes a good ice breaker as it has a relatively small end portion 49 and inclined support walls 40, 46, 50 to provide strength and to provide an uneven contact with a frozen surface.

Figure 7:
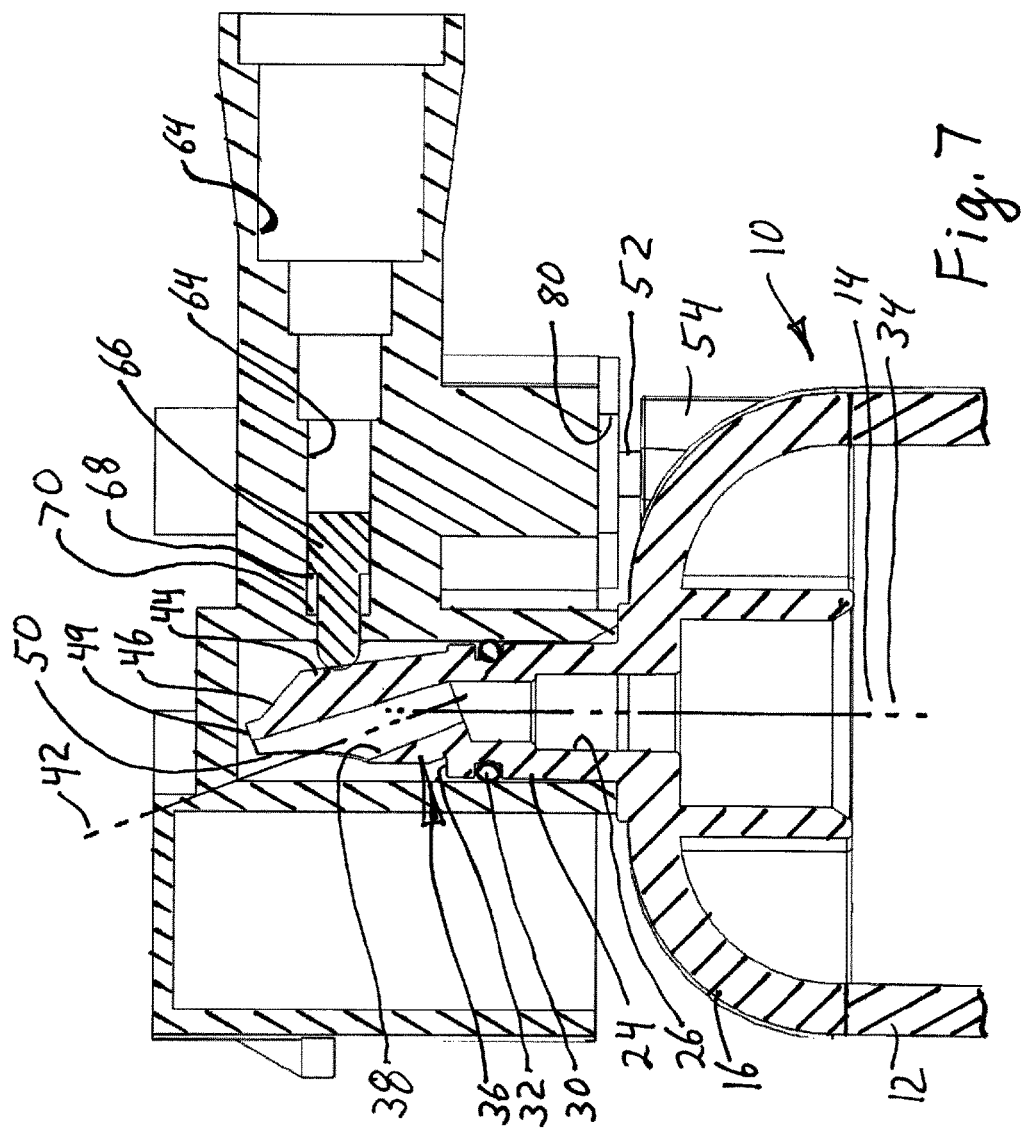
FIG. 7 is a partial sectional view of the filter of FIG. 5 in a manifold.
Figure 13:
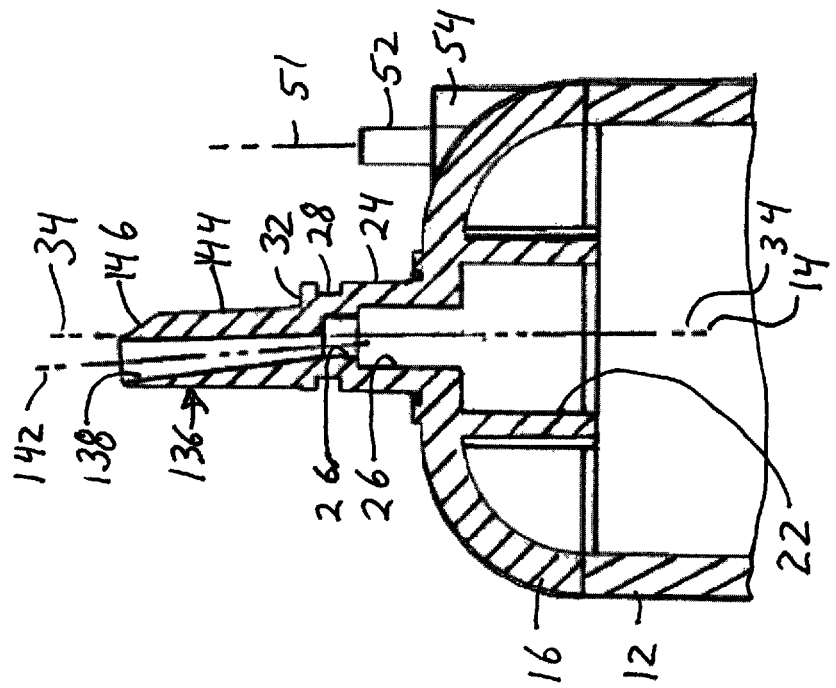
FIG. 13 is a sectional view of the second embodiment of FIG. 10.
Figure 12:
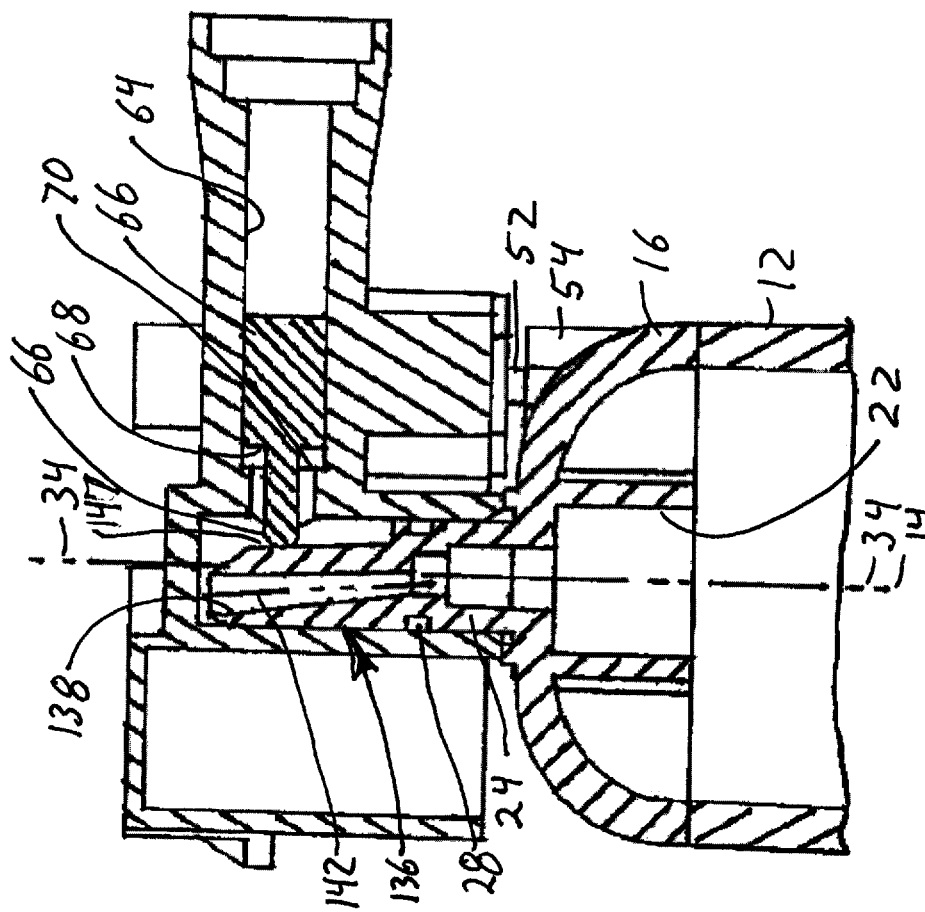
FIG. 12 is a sectional view of the second embodiment of FIG. 10 in a manifold.

Referring to FIG. 7, a manifold 60 is described that is configured to mate with the depicted nozzles 42 and tubes 24. Such manifolds are known in the art and described in more detail in U.S. Pat. No. 6,610,932, the complete contents of which are incorporated herein by reference. FIGS. 9-16 of U.S. Pat. No. 6,610,932 and corresponding text are especially of interest for the manifold and cartridge interaction. Returning to Fig. the manifold 60 has first and second tubular ports 62a, 62b respectively, which ports are sized to receive cylindrical tubes 24a, 24b, respectively and provide a water tight seal with seals 30 which are typically O-ring seals. The ports 62 have a longitudinal axis coincident with the longitudinal axis 34 of the tubes 24. In the embodiment of U.S. Pat. No. 6,610,932 the first port is an outlet port and the second port is an inlet port and that terminology is used here, but one skilled in the art will recognize the ports can be reversed by altering the inner flow passages 20 of filter cartridge 10.

Extending laterally (i.e., in an orthogonal plane) from the axis of the ports 62a, 62b are water passages 64, and specifically water outlet and water inlet 64a, 64b passages, respectively, of the manifold 60. Each inlet passage 64 has a valve seat 66 with a valve body 68 resiliently urged against the valve seat. A cam follower 66 is connected to each valve body and extends into one of the ports 62 a distance to abut at least the actuating cam surface 44 on the filter cartridge and preferably to abut end cam 46 and then slide onto cam 44.

Thus, the first outlet port 62a has first (outlet) cam follower 66a extending into the outlet port 62a on first (outlet) valve 66a so port 62a can be selectively placed in fluid communication with the first (outlet) passage 64a during use. The second inlet port 62b has second (inlet) cam follower 66b extending into the inlet port 62b on the second (inlet) valve 66b so (inlet) port 62b can be selectively placed in fluid communication with the second (inlet) passage 64b during use. When the ports 62 are empty the valve body 68 is resiliently urged against valve seat 66 to stop water from flowing into or out of the port 62. When nozzles 36 are inserted into the ports 62 the seals 30 on tubes 24 block flow out of ports 62 while the end cam 46 abuts the cam follower 66 to begin opening the valve body 68 and allow water flow, with cam surface 44 maintaining flow. The cams 46, 44 are located relative to cam followers 70 and seals 28 on tubes 24 so that the ports are blocked before the cam follower unseats valve body 68 from valve seat 66 to allow water to flow through the ports 62.

Referring to FIG. 7, the manifold has a bypass valve and passageway that block water flow to and from selective ones of the manifold's inlet and outlet passages 64a, 64b. The construction of the bypass valve is known as is the location of the projection 52 to actuate that bypass valve and allow water to flow to the respective passages 64 and ports 62 when the nozzle 36 and cams 44, 46 are sufficiently inserted into ports 62.

As seen in FIG. 8, the nozzles 26 are inclined away from the longitudinal axis 51 of protrusion 52 and preferably inclined in a plane that is not parallel to the plane containing the longitudinal axis 14 of the filter cartridge and the longitudinal axis of the protrusion 52. The longitudinal axes 42a, 42b of the nozzles 36a, 36b may lie in the same plant which is inclined to a plane orthogonal to the longitudinal axis 14 of the filer cartridge and orthogonal to the longitudinal axis 34 of the tubes 24. In the depicted embodiment of FIGS. 1-9, the longitudinal axes 42a, 42b of the nozzles 36a, 36b may also be contained in two separate but parallel planes, with one plane containing the axes 42a, 34a and cam surfaces 44a, 46a and the other plane containing axes 42b, 34b and cam surfaces 44b, 46b. That plane is best illustrated in FIG. 8 the lead lines for the 0.74 inch dimension and is at an angle of about 10° to the plane containing longitudinal axes 14 of the cartridge 10 and passing through the center of brackets 90, 92. The nozzle axes 42 are inclined away from the longitudinal axis of the protrusion 52 so that the axis 42 at the distal end portion 49 of the nozzle 24 is further away from the longitudinal axis of the protrusion 52 than is the axis 42 at the distal end 32 of the tube 24. More specifically, the longitudinal axis 42b of the inlet nozzle 36b is inclined in a direction away from the longitudinal axis 51 of protrusion 52 such that the shortest distance between the longitudinal axis of the protrusion 52 and the longitudinal axis 42b of the inlet nozzle 36b at a distal end 50b of the inlet nozzle, is greater than the shortest distance between the longitudinal axis of the protrusion and the longitudinal axis 42b of the inlet nozzle 36b adjacent the juncture with the longitudinal axis 34b of the inlet tube 24b when the axes 34, 42 are in the same plane, or adjacent the closest approach of those two axes when they are not in the same plane. Likewise, the longitudinal axis 42a of the outlet nozzle 36a is inclined in a direction away from the longitudinal axis of the protrusion 52 such that the shortest distance between the longitudinal axis of the protrusion 52 and the longitudinal axis 42a of the outlet nozzle 36a at a distal end 50a of the outlet nozzle, is greater than the shortest distance between the longitudinal axis of the protrusion and the longitudinal axis 42a of the outlet nozzle 36a adjacent the juncture with the longitudinal axis 34a of the outlet tube 24a when the axes 34, 42 are in the same plane, or adjacent the closest approach of those two axes when they are not in the same plane.

The nozzles 36 provide advantages in the undesirable event that the water freezes in the ports 62. Because nozzle passage 36 is conical and tapered outward toward the distal opening 48 of each nozzle, as the water freezes the expanding ice will push against the conical passage 38 and force the freezing ice outward along nozzle axis 42. A taper at an angle of between about 1 and about 10° from the longitudinal axis 42 is believed suitable, with a taper of about 1-5° from that axis believed preferable. That taper is believed to make it easier to disengage the ice in the nozzle passage 38 from the nozzle and from the port 62. Likewise, as best seen in FIG. 7, the nozzles 36 slant away from the manifold passages 64 and slant toward the corner of the port 62 opposite the manifold passage 64. The result is that a major portion of the outer surface 40 of the nozzle 36 is slanted toward one corner of the port 62 so that when the water freezes in the port the resulting expansion of the ice forces the nozzle 36 out of the port 62, making removal of the nozzle and cartridge 10 easier.

Also, because the distal opening 48 of the nozzle 36 is slanted or inclined relative to the longitudinal axis of the port 62 it is believed the inclination urges fracture of the ice along the nozzle opening 48 and that is believed to make it easier to remove the nozzle 36 from the port. This is especially so because the cross-sectional area of the passage 38 along axis 42 of nozzle 36 is much smaller than the cross-sectional diameter of the prior art inlet and outlet of the tubular passage which effectively have the first and second tubes 24 being extended further into the ports 62 so as to form a much larger cross-sectional area. The smaller cross-sectional area or diameter makes it easier to break the ice frozen inside the passage. While the cross-sectional diameter of the nozzle flow passage 38 is smaller than the prior art, it is believed more than capable of meeting the flow requirements which are usually low. It is also believed that the irregular surface of the nozzle 36 when viewed along the axis of the port 62 (FIG. 7) makes it easier to disengage the nozzle from the ice formed in the port 62, in part by creating multiple fracture planes at different orientations to the axis and at different locations along that axis.

Further, when the nozzle 36 is removed from a frozen port 62 the ice may be more easily removed from the nozzle passage 38 because of the conical taper of that passage which decreases in size toward the beginning of the nozzle to form a generally conical plug of ice if the nozzle is full of ice. Also, the narrow neck of the conical passage 38 where it joins the cylindrical passage of the tube 24 extending from the end wall 16 is believed to form a fracture location making it easier to break the ice if it is frozen to that portion of the filter cartridge. The portion from the juncture of the passage 38 and passage 26 to the distal opening 48 may be removed by orienting the filter downward so gravity can dislodge the ice. The portion from the juncture of the passage 38 and passage 26 toward the end wall 16 can fall by gravity or by being pushed into the body of the filter cartridge toward second cartridge end 18 in order to unblock the flow passage. Note that in FIGS. 5 and 7, the diameter of passage 26 is smaller adjacent the end 32 of the tube 24 than near the base of the tube joining the end wall 16 of the filter cartridge. That smaller diameter makes it easier for a frozen piece with the smaller diameter to be dislodged and fall into the larger diameter volume toward the end wall 16. Also, water in the filter cartridge will help melt the ice that falls inward into the filter.

Because the nozzle 36 is inclined to the axis of the port 62 which coincides with axis 34 of tubes 24, the curved edge of the nozzle travels along the port axis during insertion and that curved edge abuts any ice remaining in the port to help break and dislodge the ice. The multi-faceted surface provided by the inclined first end portion 49, the differently inclined second end portion 50, the differently inclined end cam 46 and first cam 44, and the inclined outer surface 40 of the nozzle all provide different contact points to abut any ice remaining in the port 62 to help break that ice into smaller chunks that can be removed more easily to clear the port. For any one or more of the above reasons the configuration of the nozzle 36 is believed to make it easier to remove the cartridge 10 from the manifold 60 and is believed to make it easier to remove ice from the nozzles 36 and is believed to make it easier to reinsert the nozzles 36 into the ports to clear the ports of ice.

The end of the filter cartridge may be formed as a single piece filter cap and fastened to the sidewall 12 of the cartridge 10. Thus, the tubes 26, nozzle 36, cams 44, 46, projection 52, boss 54 and recess 56 may be molded as a single piece. Also, spin welding, ultrasonic welding, adhesives and other fastening methods and mechanisms may be used to attach such a single piece filter cap to the body 12 of the cartridge 10. Optionally, the filter cartridge sidewall 12 may be molded as a single piece with and at the same time as the tubes 26, nozzle 36 and cam surface, projection 52, boss 54 and recess 56 are molded. Any suitable material that is compatible with use as a water filter may be used, with plastics being preferred for their ease of injection molding, including polyethylene, polypropylene and ABS.

When the preferred filter cartridge is configured for use with the manifold 60 of U.S. Pat. No. 7,147,773 or 7,000,894, the protrusion 52 is positioned between the longitudinal axes 34 of the first and second tubes, with the distance from the longitudinal axis 34b of the second tube 24b to the longitudinal axis of the first tube 24a is less than the distance from the longitudinal axis 24b of the second tube 34b to the longitudinal axis of the protrusion 52. Further, the distance from the longitudinal axis of the second tube 34b to the longitudinal axis of the protrusion 52 is greater than the distance from the longitudinal axis 34a the first tube 24a to the longitudinal axis of the protrusion. Moreover, the distance from the longitudinal axis 34b said the second tube 24b to the longitudinal axis 34a the first tube 24a is about 2 cm, and the distance from the longitudinal axis 34b of the second tube 24b to the longitudinal axis of the protrusion is about 2 cm, and the distance from the longitudinal axis 34a of the second tube 24a to the longitudinal axis of the protrusion is about 2 cm.

Referring to FIG. 8, a scaled drawing shows several distances (in inches) of a preferred embodiment of the above descried nozzles 36, tubes 24, cams 44, 46 and protrusion 52. The first and second tubes 24a, 24b have distal ends 32a, 32b to which are mounted the first and second tubes, 36a, and 36b, respectively. The juncture of the tubes 36 with the distal ends 32 is shown as leaving a flat end surface 32 orthogonal to the tube axis 34, but the juncture could be smooth with the walls of the nozzle blending smoothly with the walls of the tube. Thus, the juncture may include a flat surface at end 32 as depicted; it may include a larger flat or a smooth juncture eliminating the flat.

Referring to FIGS. 3a, 3b, 6a and 6b, the filter cartridges have first and second mounting connectors 90, 92, respectively on the second end of the filter body 12, adjacent the second end cap 18. The first mounting connectors 90 are preferably as described in more detail in U.S. Pat. Nos. 7,147,773 and 7,000,894, the complete contents of which is incorporated herein by reference. The mounting connector 90 preferably comprises a latch capable of being releasably engaged by an appliance. Mounting connectors 92 comprise two parallel guide rails on an opposing side of the filter housing 12 as the latch 90. The guide rails run along the cartridge housing parallel to longitudinal axis 14 for about one quarter the length of the cartridge. The rails 92 guide the cartridge 10 so the latch 90 engages a corresponding mechanism in the manifold 60 to releasably connect the cartridge to the manifold. The mounting connectors 90, 92 are known in the art and not described in more detail herein.

The above embodiments of FIGS. 1-9 illustrate a nozzle 36 inclined at a large nozzle inclination angle of about 20° relative to tube axis 34. Referring to FIGS. 10-13, a cartridge 10 with a smaller nozzle inclination angle of about 5° is described, but with the nozzle offset from the center of the tube 24. The shape of the nozzle portions 49, 50 and outer surface 40 change and the altered parts have part numbers incremented by 100 over the corresponding part numbers of embodiment of FIGS. 1-9. Thus, FIGS. 10-13 show nozzles 136 with a distal opening 148 that is in a single plane, which plane may be orthogonal to nozzle axis 142. The resulting orientation of opening 148 and the shape of that opening contrast with the prior embodiment which had the opening 48 in two planes, one of which was orthogonal to the nozzle axis 42 and encircled by first end portion 49 and one of which was inclined to the axis 42 and enclosed by second end portion 50.

Thus, in the depicted embodiment with a small inclination angle on nozzle axis 142 has first nozzle 136a has distal opening 148a in a plane orthogonal to nozzle axis 142a and defined by outer wall 140a. First cam 144a and end cam 146a extend in a radial plane through the respective cams 144, 146 and longitudinal axis 114b. Second nozzle 136b has distal opening 148b in a plane orthogonal to nozzle axis 142b and defined by outer wall 140b. To achieve the opening 148 the angle of inclination of axis 142 is small, preferably at an angle of about 3-6° and more preferably about 5° relative to the axis 34 of the tube to which the slanted nozzle is connected. The outer surface 140 of the nozzle 136 may be cylindrical, but as seen in the side view of FIGS. 10-13, the outer surface 140 of nozzle 136 is preferably generally conical but is not a symmetric cone about the nozzle axis 142. Instead, the nozzle 136 has a side profile having a lower edge (in the orientation of FIGS. 10-11) which is parallel with the lower profile edge of tubular tube 24. The nozzle 136 preferably has a cylindrical base connected to and extending from end 32 of cylindrical, tubular tube 24, offset to one side of the end 32, the lower side in the depicted orientation and embodiment. The distal nozzle opening 48 is preferably a circular opening defined by outer wall 140 and edge 49 which encircles and defines opening 48. A periphery of the opening is close the bottom edge of a cylinder extending from and along the outer periphery of cylindrical tube 24. The distal opening 148 of flow passage 138 in the nozzle 136 is thus offset from the opening of the passage 138 at the juncture with the distal end 32 of the tube 24. Because the outer surface 140 of the nozzles 136 are less inclined relative to axis 34 of the tubes 24, the cams 144, 146 are not as pronounced and have a shorter height relative to the outer surface 140 of the nozzle 136.

The outer surface 140 and inner passage 138 are preferably configured relative to each other to have a fairly uniform thickness, or less preferably to have a thickness that changes fairly uniformly along a length of the nozzle axis 142 with the thickness decreasing from the end 32 of tube 24 toward the distal opening 148, or with an increasing thickness from the distal end of nozzle 136 at opening 148 toward the juncture with end 32 of tube 24. A uniform wall thickness of nozzle 136 makes it easier to injection mold the filter cap, and a uniform change in wall thickness is less preferable than a uniform wall thickness but is still capable of injection molding. As used herein, a fairly uniform thickness includes a thickness that varies by about 0.1 inches in thickness per inch along the length of nozzle axis 142.

Because the wall thickness forming nozzle 136 can vary and because the outer configuration of the nozzle 136 can vary the configuration of cams 146, 148 can vary. It is believed possible that the cams 146, 148 may form a portion of the outer wall of the nozzle 142.

Further, as the angle of inclination of nozzle axis 142 increases, the opening 48 preferably assumes one of two configurations. Referring to FIGS. 10-13, in the first configuration the opening 148 is in a single plane that is preferably orthogonal to the nozzle axis 142 at smaller angles of inclination, with the opening 148 generally circular. Referring to FIGS. 1-9, the opening 48 is in a second configuration and when viewed along axis 42 is more elliptical than circular. In this first configuration the opening 142 has a generally circular shape when viewed along the longitudinal axis 42 of the nozzle and a generally elliptical shape when viewed along the longitudinal axis 34 of the tube 32, with the length of the major axis of the generally shape increasing as the angle of inclination of the nozzle axis 142 increases relative to the axis 34. As used herein the reference to a generally elliptical shape includes a shape that varies by about 3 mm or less from an elliptical shape. In the second configuration at the larger inclination of nozzle axis 42 as shown in FIGS. 1-9, the opening 48 is in two planes forming first end portion 149 and second end portion 150, with first end portion 149 at an angle relative to the plane orthogonal to tube axis 34, and the second end portion 150 allowing flow out of nozzle passage 158 into the cylindrical volume defined by the outer cylindrical periphery of the tube 24 and the ports 62.

In the above configurations and orientations of opening 148 of nozzle 136, the nozzle configuration presents multiple surfaces inclined to the longitudinal axis 34 so as to abut and dislodge ice from the ports 62 in the manifold 60 as described above. The abutting surface of nozzle 136 is preferably at different levels and angles of inclination relative to tube axis 34 which is coincident with the longitudinal axis of port 62. The multi-level, multi-inclined distal surface of nozzles 136a, 136b are believed to advantageously dislodge ice from the ports 62 into which the nozzles are inserted during use. Moreover, the flow out the openings 48, 148 are directed toward one corner of the port of the manifold into which the nozzles 36, 136 fit during use and that directional flow is believed to cause a beneficial flow which helps remove ice from the end corners of the port, and to also circulate the flow into the port.

Referring to FIGS. 14-20, a third embodiment is described in which like parts having like numbers except for the nozzle which has the parts incremented by 200. In this further embodiment the nozzle 236 has a tubular shape with a generally circular cross-section taken along the longitudinal axis 242 of the nozzle so as to form a cylindrical tube inclined along nozzle axis 242. The ridge 44 and its end 46 are not used in this embodiment. The outer surface 240 of the slanted nozzle 236 abuts and actuates cam follower 66 along a portion 247 of the inclined nozzle surface that acts as a cam and that abutting nozzle cam surface 427 (FIG. 15) abutting the cam follower 66 forms the actuating cam surface. The cam surface 247 is shown in broken lines in FIGS. 15, 16c as it is preferably a portion of the cylindrical outer surface 240 of nozzles 236, but it may be a raised surface.

The angle of inclination of axis 242 is preferably about 12-20° and more preferably about 14-18° and still more preferably about 16° relative to an axis parallel to the longitudinal axis of the filter cartridge 10, or relative to the longitudinal axis 34 of the tubular tube 24 to which the slanted, tubular nozzle 36' is connected. The inner passage 38 of each slanted, tubular nozzle 36' preferably expands from the base of the nozzle adjacent the cylindrical tubes 24 in a conical shape having a diameter that is smaller adjacent the cylindrical tube 24 and that is larger at the distal end of the slanted, tubular nozzle 36'. A taper at an angle of about 1° to about 10° from the longitudinal axis 242 is believed suitable, with a taper of about 1-5° from that axis believed preferable.

The slanted, tubular nozzle 236 has a first distal end portion 249 that is shaped so that it is orthogonal to the longitudinal axis 242 of the slanted, tubular tube 236 and preferably has rounded edges. The outer surface 240 of the slanted, tubular nozzle 236 is preferably cylindrical and preferably the first portion 249 includes the circular, distal opening of interior flow passage 238 or a substantial portion of that distal opening, preferably 80% or more of the diameter and more preferably from 90-100% of the diameter of the interior passage 238 at the distal end of nozzle 236 measured in the plane orthogonal to axis 242. Thus, when viewed along nozzle axis 242 the opening in the distal end 49 of the nozzle 36' is preferably circular and when viewed along the axis 34 of tube 24 the opening is elliptical.

A second portion 250 of distal end of the slanted, tubular nozzle 236 is shaped to fit inside a cylinder having a diameter slightly less than the outer diameter of the tube 24 to which the slanted, tubular nozzle 236 is connected. In the depicted embodiment the second portion 250 has a curved contour formed by intersecting the projected cylindrical surface having a diameter slightly smaller than the diameter of cylindrical tube 24 with a cylinder having the diameter of slanted nozzle 36' and extending at an angle of about 16° from the axis 34 of the tube 24. The slanted, tubular nozzle 236 preferably fits within cylindrical port 62 during use and the second portion 250 is preferably sized to allow a clearance with the facing surface of the cylindrical port 62 suitable for easy insertion and removal of the filter cartridge 10 in the ports 62 and manifold 60. A clearance of 0.01-0.1 inches is believed suitable, and making the counter of second portion 50 about 0.01-0.1 inches smaller than the outer diameter of the cylindrical tube 24 is believed to achieve the desired fit.

The slanted, tubular nozzle 236 has a generally cylindrical outer surface 240 for at least a short distance from the plane orthogonal to the longitudinal axis 34 of the tube 24 at the end of the tube 24. Preferably the generally cylindrical outer surface 240 extends for a distance of about half of length of the slanted nozzle 36' measured along its longitudinal axis 242 to the first distal end portion 249. The larger the angle of inclination of the axis 34 of slanted nozzle 236 the shorter the length of the outer cylindrical surface of the tubular nozzle 236. The longitudinal axis 242 of the slanted tubular nozzle 36' is vertically offset from the plane through the end of the tube 24 and orthogonal to the tube axis 34. In the depicted embodiment the internal passage 26 of the tube 24 ends at an inclined surface that is orthogonal to the slanted nozzle axis 242. The angle of inclination of this plane is the same as the angle of inclination of the axis of nozzle 236 which is preferably about 16° measured in the plane orthogonal to the axis 34. As measured in this inclined plane the vertical offset of the axis 42 of slanted nozzle 236 is about 0.03 inches for the 16° inclination of slanted nozzle axis 236. Measured in the plane orthogonal to axis 34 and through the end of tube 24 to which the slanted nozzle 36' is mounted the vertical offset along axis 34 is about 0.02 inches. As used herein, this construction means that the longitudinal axes of the nozzles 236 thus intersect the longitudinal axes 34 of the tubes 24 outward from the distal end 32 of those tubes 24.

The cylindrical tube 24 which extends from the end 16 of filter cartridge 10 thus has a first longitudinal axis 24 which is inclined to the axis 242 of the slanted, nozzle 36' preferably at an angle of about 16°. The slanted longitudinal axis 242 of the slanted nozzle 36' is also vertically offset above the end of the cylindrical tube 24, depending on whether the internal passage 26 ends in a plane inclined to axis 34 and orthogonal to axis 242, or whether the internal passage 26 ends in a plane orthogonal to axis 26 and inclined to axis 242 of slanted nozzle 236. The amount of offset varies with the inclination angle of the slanted nozzle 236.

The slanted tubular nozzle 236 has the same advantages as the prior nozzle 36. The conical passage 238 in the nozzle 236 is believed to allow frozen water to more easily be removed from the nozzle and is believed to allow the filter cartridge be more easily removed from a frozen manifold 60 and ports 62. The expanding ice in the conical nozzle passages 238 urge the ice out of the passage as the ice forms. Likewise, the narrow diameter of passage 238 of nozzle 236 at the juncture with passage 26 of tube 24 is believed to provide a fracture point to facilitate breaking off of ice formed in the slanted nozzle 236 and tube 24 to further facilitate removal of frozen cartridges from manifold 60 and ports 62. Additionally, the longer length of the tubular base of slanted nozzle 236 adjacent the end of the tube 24 provides for a stronger slanted nozzle 236 more suited to breaking free any ice in manifold 60 and ports 62 when the nozzle 236 is reinserted into a frozen manifold from which the cartridge has been removed. Additionally the inclined distal end 249 of the slanted nozzle 236 is believed suitable to fracture ice remaining in manifold 60 and ports 62 when the nozzle 236 is removed and inserted.

Further inclining the nozzle 236 and its passage 238 relative to the axis 34 of tube 24 is believed to direct the water into the inlet port 62 of the manifold 60 at an angle that is inclined to the longitudinal axis of the port and inclined to the axis 34 of the tube 24 so as to circulate the water in the port and facilitate removal of ice from the manifold inlet port. Further, the flow from the inclined axis 242 of passage 238 is directed toward one side of the port 62 adjacent the end corner of the port which is believed to further provide a defined circulation in the blind end of the port to facilitate removal of ice that may remain in the port.

As describe above, the slanted nozzles 36, 136, 236 may be slanted at various angles relative to the longitudinal axis 34 of the tube 24 or relative to an axis parallel to that axis 34 (as the nozzle axes may be laterally offset from axis 34). The outer surface of the slanted nozzles 36, 136, 236 may be generally cylindrical as in the first and third embodiments, or may be conical as in the second embodiment of FIGS. 10-13. The longitudinal axis of the slanted nozzles 36, 136, 236 may be offset laterally from the longitudinal axis 34 of the tube 24 through end 32 to which the nozzles are connected, as best illustrated by the second embodiment of FIGS. 10-13. The longitudinal axis of the slanted nozzles 36, 136, 236 may be offset vertically above the end of the end 32 of tube 24 to which the slanted nozzles are connected as best illustrated by the first and third embodiments and FIGS. 7, 9, 18 and 20. The shape of the distal end of the slanted nozzles 36, 136, 236 vary with the angle of inclination of the longitudinal axis of the slanted nozzles and the shape of the ports 62 in the manifold 60 into which the slanted nozzles and tubes 24 are inserted. The receiving ports 62 are typically cylindrical and thus the distal ends of the slanted nozzles 36, 136, 236 are preferably in the general shape of two intersecting curved surfaces with the first intersecting surface being an imaginary cylinder extending along the outer surface of the tube 24 to which the nozzle is connected (and thus extending along tube axis 34), while the second intersecting surface being an imaginary curved surface being an imaginary cylinder to conical surface extending along the outer surface of the slanted nozzle but ending at the end of the nozzle.

The intersection of these first and second imaginary curved surfaces may thus result in a planar distal end portion 49 entirely surrounding the opening of the flow passage 238 at small angles of inclination and nozzle lengths short enough that they first and second curved surfaces do not intersect as in the second embodiment of FIGS. 10-13. When the angle of inclination is large, the intersection of these first and second imaginary curved surfaces may also result in a nozzle with a distal end having a small planar distal end 49 only partially defining the opening 48 of flow passage 38 and a large second surface 50 as in the first embodiment of FIGS. 1-9. At an intermediate angle of inclination as in the third embodiment of FIG. 14-20, the slanted nozzle 236 may have a distal opening 238 in a single surface 249 but with a second surface 250 altering the outer configuration of an otherwise cylindrical nozzle 236 as the first and second curved surfaces intersect.

In the above description the flow passage 38, 138, 238 is generally conical so that if ice freezes in the flow passage the expansion of the ice as it freezes forces the ice out of the nozzle 36 containing the passage 38. As used herein, the generally conical flow passage 38, 138, 238 has a conical shape that is larger than the potential taper used to facilitate molding and removal of plugs used to form cylindrical passages. The taper is preferably about 2° to about 5° degrees for a half angle, measured from longitudinal axis 42, or about 4° to about 10° whole angle measured on both sides of axis 42 and from side-to-side on the flow passage 38, 138, 236.

While a conical passage is preferred, the passage 38, 138, 238 could be cylindrical or only slightly tapered to allow draft for removal of plugs used in molding to form the cylindrical passage. This cylindrical passage is less preferred as it reduces the ice-expulsion advantages of the conical flow passage and the ice fracture at the juncture of the narrow conical tip and the larger passage 26 of tube 24, but a cylindrical passage 38, 138, 238 still has the advantage of directing the flow of water out the nozzle 36 at an angle to the tube 24 and toward a side or corner of port 62 of the manifold 60.

The above description is given by way of example, and not limitation. Given the above disclosure, one skilled in the art could devise variations that are within the scope and spirit of the invention disclosed herein, including various angles of inclination of the nozzle 36 and various external shapes of the nozzle. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A water filter cartridge for operatively engaging a water filter head assembly, the head assembly comprising one or more valves, for the control of water passing through the head assembly, the head assembly having an inlet cam follower extending into an inlet port to actuate an inlet valve in fluid communication with the inlet port, the head assembly having an outlet cam follower extending into an outlet port to actuate an outlet valve in fluid communication with the outlet port, and having a bypass valve with a bypass cam follower configured to control water flow to the inlet and outlet ports, the cartridge comprising:
   an end piece, the end piece comprising:
   a. an end piece wall;
   b. an inlet tube having a longitudinal axis and extending from the end piece wall, the inlet tube having a distal end spaced apart from the end piece wall;
   c. a slanted, tubular inlet nozzle connected to the distal end of the inlet tube, the inlet nozzle having a longitudinal axis inclined at an angle to the longitudinal axis of the inlet tube of about 5° to about 20° and in a direction away from the end piece, with an inlet flow passage extending along the longitudinal axis of the inlet nozzle and extending along the longitudinal axis of the inlet tube, the inlet nozzle having an inlet cam surface extending along a length of the inlet nozzle and located on an outer surface of the inlet nozzle;
   d. an outlet tube having a longitudinal axis and extending from the end piece wall, the outlet tube having a distal end spaced apart from the end piece wall
   e. an outlet nozzle connected to the distal end of the outlet tube, the outlet nozzle having a longitudinal axis inclined at an angle to the longitudinal axis of the end piece of about 5° to about 20° and in a direction away from the outlet tube, with an outlet flow passage extending along the longitudinal axis of the outlet nozzle and along the longitudinal axis of the outlet tube, the outlet nozzle having an outlet cam surface extending along a length of the outlet nozzle and on an outer surface of the outlet nozzle, wherein the flow passage through at least one of the inlet nozzle and outlet nozzle is generally conical, having a narrower diameter adjacent the juncture of the at least one of the inlet nozzle and outlet nozzle with the inlet tube or outlet tube to which it is respectively connected and tapering at an angle of about 1° to about 5° relative to the longitudinal axis of the at least one of the inlet nozzle and outlet nozzle;
   f. a protrusion extending from the end piece wall and having a longitudinal axis that is positioned between the longitudinal axes of the inlet tube and the outlet tube and located to engage the bypass valve in the head assembly during use;
   a cartridge housing having a first end, a closed second end, and a longitudinal axis extending therebetween substantially parallel to the longitudinal axis of the inlet tube, wherein the end piece wall is connected to the first end of the cartridge housing, and wherein a portion of the inlet cam surface of the inlet nozzle is inclined relative to the longitudinal axis of the inlet tube at an angle of about 2° to about 26° to engage the inlet cam follower when the inlet nozzle is inserted into the inlet port during use, and wherein a portion of the outlet cam surface of the outlet nozzle is inclined relative to the longitudinal axis of the outlet tube at an angle of about 2° to about 26° to engage the outlet cam follower when the outlet nozzle is inserted into the outlet port during use.

2. The water filter cartridge of claim 1, wherein the longitudinal axis of at least one of the inlet nozzle and outlet nozzle is inclined in a direction away from the longitudinal axis of the tube to which the at least one of the inlet nozzle and outlet nozzle is connected at an angle of about 16°.

3. The water filter cartridge of claim 1, wherein the longitudinal axis of at least one of the inlet nozzle and outlet nozzle is inclined in a direction away from the longitudinal axis of the tube to which the at least one of the inlet nozzle and outlet nozzle is connected at an angle of about 16° and the at least one inlet and outlet nozzle has a generally cylindrical outer surface extending for about half the length of the at least one inlet nozzle and outlet nozzle.

4. The water filter cartridge of claim 1, wherein the longitudinal axis of both the inlet nozzle and outlet nozzle are inclined at an angle of about 16° relative to the longitudinal axis of the tube to which the respective inlet and outlet nozzles are connected, and wherein the longitudinal axes of the inlet and outlet nozzles are offset vertically so the axis of the inlet nozzle intersects the longitudinal axis of the inlet tube to which the inlet nozzle is connected at a location that is outward from the distal end of the inlet tube, and wherein the longitudinal axis of the outlet nozzle intersects the longitudinal axis of the outlet tube to which the outlet nozzle is connected at a location that is outward from the distal end of the outlet tube.

5. The water filter cartridge of claim 1, wherein the longitudinal axis of the inlet and outlet nozzles are each laterally offset from the longitudinal axis of the inlet and outlet tube to which the nozzle is connected, the offset being a distance of about 0.02 inches to 0.1 inches measured in a plane through the distal end of the inlet and outlet tube from which each inlet and outlet fitting is connected.

6. The water filter cartridge of claim 1, wherein the inlet flow passage through the inlet nozzle is generally conical, having a narrower diameter adjacent the juncture of the inlet nozzle with the inlet tube and tapering at a half angle of about 1 degree to about 5 degrees relative to the longitudinal axis of the inlet nozzle.

7. The water filter cartridge of claim 1, wherein the inlet flow passage through the inlet nozzle has an opening at a distal end of the inlet nozzle which has a first portion inclined to the longitudinal axis of the inlet nozzle and a second portion which is orthogonal to the longitudinal axis of the inlet nozzle.

8. The water filter cartridge of claim 1, wherein the inlet flow passage through the inlet nozzle has an opening at a distal end of the inlet nozzle which has a portion inclined to the longitudinal axis of the inlet nozzle at an angle of up to 89° and wherein that opening crosses the longitudinal axis of the inlet nozzle.

9. The water filter cartridge of claim 1, wherein the flow passage through at least one of the inlet nozzle and outlet nozzle has an opening at a distal end of the at least one of the inlet nozzle and outlet nozzle which opening lies generally in a plane orthogonal to the longitudinal axis of the flow passage through the nozzles.

10. The water filter cartridge of claim 1, wherein the flow passage through at least one of the inlet nozzle and outlet nozzle has an opening at a distal end of the at least one of the inlet nozzle and outlet nozzle in which the opening lies in a plane and forms a generally elliptical shape when viewed along an axis parallel to the longitudinal axis of the inlet or outlet tube.

11. The water filter cartridge of claim 1, wherein the flow passage through at least one of the inlet and outlet nozzles has an opening at a distal end of the at least one inlet or outlet nozzle which has a first portion inclined to the longitudinal axis of the at least one inlet or outlet nozzle and has a second portion orthogonal to the longitudinal axis of the at least one inlet or outlet nozzle.

12. The water filter cartridge of claim 1, wherein the flow passage through at least one of the inlet and outlet nozzles has an opening at a distal end of the at least one inlet or outlet nozzle which has a first portion inclined to the longitudinal axis of the at least one inlet or outlet nozzle and has a second portion orthogonal to the longitudinal axis of the at least one inlet or outlet nozzle and subtending an arc of less than 90 degrees.

13. The water filter cartridge of claim 1, wherein the at least one of the inlet and outlet nozzles are inclined at an angle of about 14-18° relative to an axis parallel to the longitudinal axis of the outlet tube.

14. The water filter cartridge of claim 1, further comprising an outlet seal encircling the outlet tube adjacent the distal end of the inlet tube and an inlet seal encircling the outlet tube adjacent the distal end of the inlet tube.

15. The water filter cartridge of claim 1, wherein the inlet cam surface has a first cam portion extending outward from and along a length of an outer surface of the inlet nozzle at a first angle relative to an axis parallel to the longitudinal axis of the inlet tube, and has a second cam end portion adjacent a distal end of the inlet nozzle which second cam end portion is inclined at a second angle relative to the axis parallel to the longitudinal axis of the inlet tube, with the second angle being greater than the first angle.

16. The water filter cartridge of claim 15, wherein the outlet cam surface has a first cam portion extending outward from and along a length of an outer surface of the outlet nozzle at a first angle relative to an axis parallel to the longitudinal axis of the outlet tube, and has a second cam end portion adjacent a distal end of the outlet nozzle which second cam end portion is inclined at a second angle relative to the axis parallel to the longitudinal axis of the outlet tube, with the second angle being greater than the first angle.

17. The water filter cartridge of claim 1, wherein the longitudinal axes of the inlet nozzle and outlet nozzle are inclined at an angle of about 16° to the longitudinal axis of the tube to which they are connected and the inlet and outlet nozzles have an outer, generally cylindrical surface extending for about half the length of the nozzles.

18. The water filter cartridge of claim 1, wherein the inlet and outlet nozzles each have a distal end having a first portion in a plane orthogonal to the longitudinal axis of the passage through the respective inlet and outlet nozzles, with the inlet flow passage and outlet flow passage forming a circular opening in that first portion.

19. The water filter cartridge of claim 1, wherein the flow passage through at least one of the inlet and outlet nozzles has an opening at a distal end which opening has a first portion orthogonal to the longitudinal axis of the at least one inlet or outlet nozzle and has a second portion inclined to the longitudinal axis of the at least one inlet and outlet nozzle.

20. The water filter cartridge of claim 1, wherein the inlet cam surface has a first inlet cam portion extending outward from and along a length of the outer surface of the inlet nozzle at a first angle relative to the longitudinal axis of the inlet tube, and has a second inlet cam end portion adjacent a distal end of the inlet nozzle which second inlet cam end portion is inclined at a second angle relative to the longitudinal axis of the inlet tube, with the second angle being greater than the first angle, and wherein the outlet cam surface has a first outlet cam portion extending outward from and along a length of an outer surface of the outlet nozzle at a first angle relative to the longitudinal axis of the outlet tube, and has an outlet second cam end portion adjacent a distal end of the outlet nozzle which second outlet cam end portion is inclined at a second angle relative to the axis parallel to the longitudinal axis of the outlet tube, with the second angle being greater than the first angle.

21. A water filter cartridge for operatively engaging a water filter head assembly, the head assembly comprising one or more valves for the control of water passing through the head assembly, the head assembly having an inlet cam follower extending into an inlet port to actuate an inlet valve in fluid communication with the inlet port, the head assembly having an outlet cam follower extending into an outlet port to actuate an outlet valve in fluid communication with the outlet port, the head assembly having first and second generally cylindrical ports, the cartridge comprising:

an end piece, the end piece comprising:
  a. an end piece wall;
  b. an inlet tube having a longitudinal axis and extending from the end piece wall, the inlet tube having a distal end spaced apart from the end piece wall;
  c. a slanted, tubular inlet nozzle connected to the distal end of the inlet tube, the inlet nozzle having a longitudinal axis inclined at an angle to the longitudinal axis of the inlet tube of about 5° to about 20° in a direction away from the end piece, with an inlet flow passage extending along the longitudinal axis of the inlet nozzle and extending along the longitudinal axis of the inlet tube, the inlet nozzle having an inlet cam surface extending along a length of the inlet nozzle and located on an outer surface of the inlet nozzle, the inlet nozzle configured to fit within one of the first and second generally cylindrical ports in the head assembly during use;
  d. an outlet tube having a longitudinal axis and extending from the end piece wall, the outlet tube having a distal end spaced apart from the end piece wall
  e. an outlet nozzle connected to the distal end of the outlet tube, the outlet nozzle having a longitudinal axis inclined at an angle to the longitudinal axis of the end piece of about 5° to about 20° in a direction away from the outlet tube, with an outlet flow passage extending along the longitudinal axis of the outlet nozzle and along the longitudinal axis of the outlet tube, the outlet nozzle having an outlet cam surface extending along a length of the outlet nozzle and on an outer surface of the outlet nozzle, wherein the flow passage through at least one of the inlet nozzle and outlet nozzle is generally conical, having a narrower diameter adjacent the juncture of the at least one of the inlet nozzle and outlet nozzle with the inlet tube or outlet tube to which it is respectively connected and tapering at an angle of about 1° to about 5° relative to the longitudinal axis of the at least one of the inlet nozzle and outlet nozzle;

f. a protrusion extending from the end piece wall and having a longitudinal axis that is positioned between the longitudinal axes of the inlet tube and the outlet tube and located to engage the bypass valve in the head assembly during use;

a cartridge housing having a first end, a closed second end, and a longitudinal axis extending therebetween substantially parallel to the longitudinal axis of the inlet tube, wherein the end piece wall is connected to the first end of the cartridge housing, and wherein a portion of the inlet cam surface of the inlet nozzle is inclined relative to the longitudinal axis of the inlet tube at an angle of about 2° to about 26° to engage the inlet cam follower when the inlet nozzle is inserted into the inlet port during use, and wherein a portion of the outlet cam surface of the outlet nozzle is inclined relative to the longitudinal axis of the outlet tube at an angle of about 2° to about 26° to engage the outlet cam follower when the outlet nozzle is inserted into the outlet port during use.

* * * * *